(12) United States Patent
Watanabe

(10) Patent No.: US 6,339,573 B2
(45) Date of Patent: Jan. 15, 2002

(54) APPARATUS FOR EXPOSING OPTICAL DISC MASTER PLATE AND METHOD OF EXPOSING THE SAME

(75) Inventor: Hisao Watanabe, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/784,073

(22) Filed: Feb. 16, 2001

Related U.S. Application Data

(62) Division of application No. 09/227,859, filed on Jan. 11, 1999, now Pat. No. 6,212,146.

(30) Foreign Application Priority Data

Jan. 9, 1998 (JP) .......................... 10-002888
Mar. 23, 1998 (JP) .......................... 10-073732

(51) Int. Cl.$^7$ ................................ G11B 7/00
(52) U.S. Cl. ................ 369/59.12; 369/53.23; 369/44.13; 369/84
(58) Field of Search .................. 369/44.26, 44.28, 369/44.13, 47.1, 47.12, 53.1, 53.2, 53.21, 53.23, 53.28, 53.41, 59.1, 59.12, 59.19, 59.25, 84, 275.1

(56) References Cited

U.S. PATENT DOCUMENTS 5,119,359 A * 6/1992 Miyagi et al. ....... 369/275.3 X
5,844,883 A * 12/1998 Kanno et al. ............ 369/53.29

* cited by examiner

Primary Examiner—Muhammad Edun
(74) Attorney, Agent, or Firm—Oblon, Spivak, McClelland, Maier & Neustadt, P.C.

(57) ABSTRACT

The present invention provides an exposure apparatus of an optical disc master plate for exposing a photoresist master plate and writing-in a DVD-R format, and a method of exposing an optical disc master plate. The exposure apparatus of the optical disc master plate can cause both the wobble signal and the land pre-pit signal to precisely synchronize with each other and to output the synchronized signals by use of a formatter. The formatter can facilitate the design of a separation element for electrically separating an analog circuit and a digital circuit from each other and a circumferential circuit thereof. The formatter of the optical disc exposing apparatus operates on the basis of the predetermined basic clock signal Fclk. The formatter is provided with a wobble signal generating circuit which generates a wobble signal and a land pre-pit signal generating circuit which operates on the basis of the same basic clock signal Fclk and generates a land pre-pit signal. The wobble signal generating circuit is provided with a frequency dividing circuit for dividing the frequency of the basic clock signal Fclk and operates on the basis of the frequency-divided clock

55 Claims, 14 Drawing Sheets

APPARATUS FOR EXPOSING OPTICAL DISC MASTER PLATE AND METHOD OF EXPOSING THE SAME

This application is a Div. of Ser. No. 09/227,859 filed Jan. 11, 1999, U.S. Pat. No. 6,212,146.

BACKGROUND OF THE INVENTION

1. Field of the Invention

The present invention relates to an apparatus for exposing an optical disc master plate, and in particular, to an exposing apparatus for exposing an optical disk master plate which exposes a photoresist master plate and writes in a DVD-R (Digital Video Disc Recordable) format therein, and a method of exposing an optical disc master plate.

2. Discussion of the Background Art

According to a document, entitled "DVD Specifications for Recordable Disc/part 1. Physical Specification Version 0.9 April 1997", the DVD-R disc format forms a wobble track recorded with a sinusoidal wave signal of constant frequency for use in the synchronization of disc rotation and a land pre-pit for storing address information, etc., over the entire information area. The land pre-pit is the pit disposed on the land between the wobble tracks, and is formed in constant relationship with the wobble phase of the track. FIG. 13 is a graph showing the phase relationship between the wobble signal and the pre-pit signal.

As shown in FIG. 14, the land pre-pit employs a 2-sync.-frame length as one unit and sets an even number position and an odd number position at the head portion each of the 1-sync.-frame lengths. The length of 1-sync.-frame equals the length of an 8-wobble period. An overlap between the tracks on which the land pre-pits are formed adjacently to each other can be avoided by changing the position thereof, so that the land pre-pit is successively formed on a spiral track. If the land pre-pits overlap each other, the land pre-pit signal cannot be correctly reproduced at the time of DVD-R (format) reproduction. However, in regard to the exposing apparatus of the optical disc master plate for exposing the photoresist master plate and writing in the DVD-R format, it is not well known in the related technology that the wobble signal for wobbling the track output from the exposure signal generating apparatus (formatter) which generates the exposure signal for exposing the photoresist master plate is precisely synchronized with the land pre-pit signal.

In regard to the formatter, it can be understood that the wobble signal is generated by the wobble signal generating apparatus, the land pre-pit signal is generated by the land pre-pit signal generating apparatus, a certain phase point during the wobble period of the wobble signal is extracted, a trigger signal is created in order to output the land pre-pit signal in a certain phase relationship with the wobble signal based upon the phase extracting signal, and the trigger signal thus created is output to the land pre-pit signal generating apparatus.

However, in such a formatter as mentioned above, a variation width occurs at the extracted phase point. This variation width is also superposed on the trigger signal. As a result, the precise land pre-pit signal cannot be output.

SUMMARY OF THE INVENTION

The present invention was made in consideration of the above-mentioned and other problems in order to improve such various subject matters.

It is an object of the present invention to solve and improve the above-mentioned and other subject matters on the defects of the related background arts.

It is another object of the present invention to provide a novel apparatus for exposing an optical disc master plate capable of solving the defects of the related art and a method of exposing an optical disc master plate.

It is still another object of the present invention to provide a novel exposure apparatus for exposing an optical disc master plate capable of precisely synchronizing a wobble signal with a land pre-pit signal in an exposure signal generating apparatus and outputting therefrom the synchronized signals.

It is still another object of the present invention to provide a novel exposure apparatus for exposing an optical disc master plate which enables an exposure signal generating apparatus to facilitate the design of a separation element for electrically separating an analog circuit and a digital circuit from each other and a circumferential circuit thereof It is still another object of the present invention to provide a novel exposure apparatus for exposing an optical disc master plate which simplifies the adjustment of the track wobble phase and the land pre-pit forming phase.

It is still another object of the present invention to provide a novel exposure apparatus for exposing an optical disc master plate capable of avoiding an overlap of the land pre-pits upon on each other without the addition of a special circuit, etc. to the exposure apparatus.

It is still another object of the present invention to provide a novel exposure apparatus for exposing an optical disc master plate capable of judging in advance the occurrence of an overlap between the land pre-pits for each revolution of the photoresist master plate and avoiding the occurrence of the overlap therebetween.

It is still another object of the present invention to provide a novel exposure apparatus for exposing an optical disc master plate further capable of precisely avoiding the occurrence of an overlap between the land pre-pits on such an occasion.

It is still another object of the present invention to provide a novel exposure apparatus for exposing an optical disc master plate capable of avoiding the occurrence of an overlap between the land pre-pits with high resolution and high accuracy.

It is still another object of the present invention to provide a novel exposure apparatus for exposing an optical disc master plate capable of reducing the burden of the processing operational calculations for avoiding an overlap between the land pre-pits.

It is still another object of the present invention to provide a novel exposure apparatus for exposing an optical disc master plate capable of compensating for any variation of the rotative speed of a photoresist master plate which occurs due to an environmental change, etc. and precisely avoiding an overlap between the land pre-pits.

It is still another object of the present invention to provide a novel exposure apparatus for exposing an optical disc master plate capable of providing an alarm signal for indicating the presence of an abnormal state in avoiding an overlap between the land pre-pits and for avoiding an abnormal state in the (straight) line velocity of the exposure.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
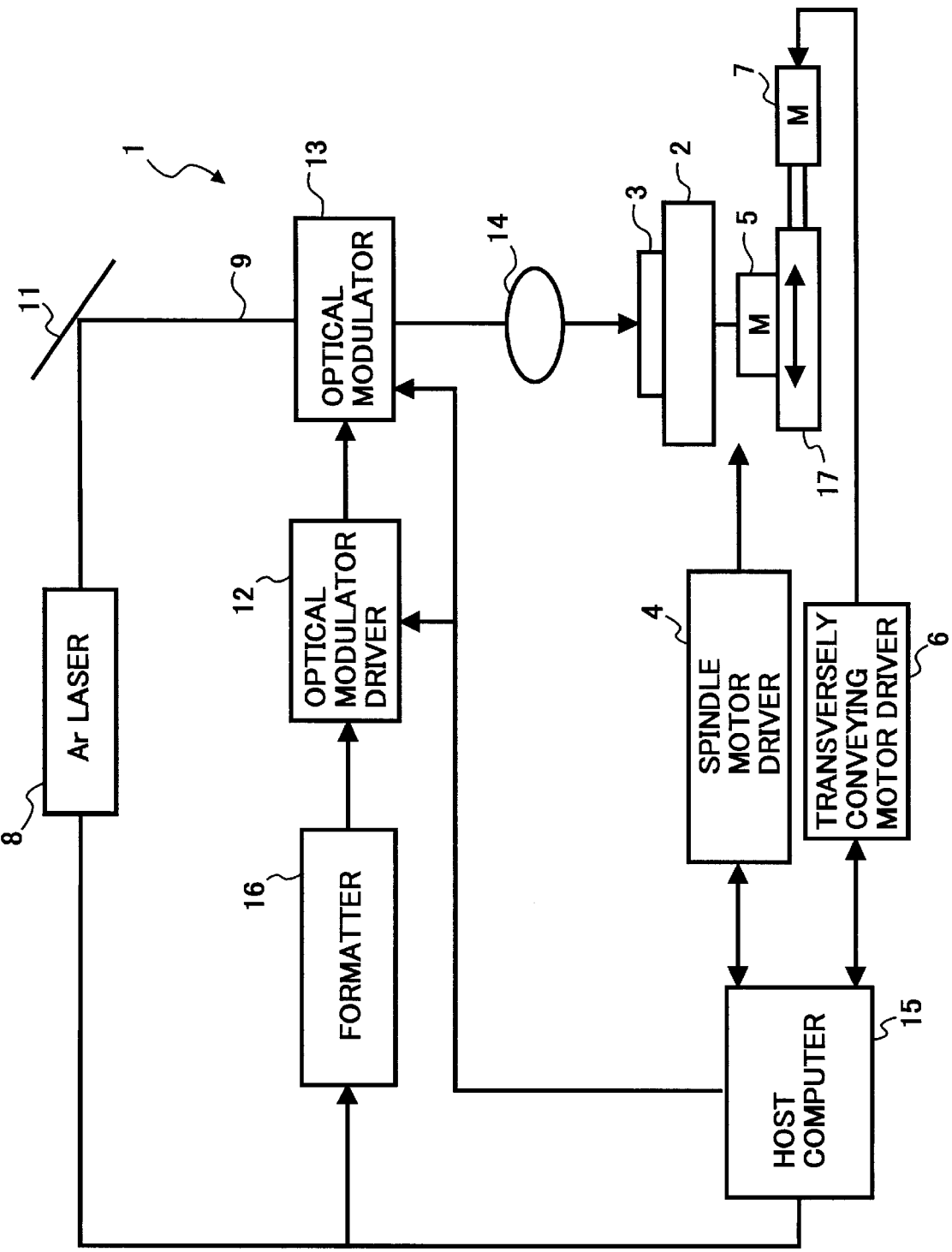
FIG. 1 is a block diagram showing an overall outline of an exposure apparatus for exposing an optical disc master plate in a first embodiment of the present invention.

A first embodiment of the present invention relates to an exposure apparatus of an optical disc master plate for exposing a photoresist master plate and writing-in a DVD-R format including a light source for emitting laser light for use in exposing the photoresist master plate. An exposure signal generating apparatus generates an exposure signal for exposing a photoresist master plate. An optical modulator converts the laser light to an optical signal having an adjusted pulse width by turning on and off the light source based upon the pulse width. A disc rotating apparatus rotates the photoresist master plate and positioning the photoresist master plate in the circumferential direction on the position of the laser light radiation. An apparatus laterally moves a disc for moving the photoresist master plate in a radial direction and positions the photoresist master plate on the position of the laser light radiation in the radial direction.

The exposure signal generating apparatus includes: a wobble signal generating circuit operating in accordance with a predetermined basic clock signal and generating a wobble signal, and a land pre-pit signal generating circuit operating in accordance with the same basic clock signal and generating a land pre-pit signal.

Consequently, in such a structure, the wobble signal and the land pre-pit signal can be precisely synchronized and output by action of the same basic clock signal.

A second embodiment of the present invention relates to an exposure apparatus of an optical disc master plate relating to the above-noted first embodiment, in which the wobble signal generating circuit includes a frequency dividing circuit for dividing the frequency of the basic clock signal, and in which the wobble signal generating circuit operates in accordance with the dividing signal obtained by dividing the basic clock signal.

Consequently, although the operational frequency of the wobble signal generating circuit is suppressed to a lower value, the operational frequency of the overall exposure signal generating apparatus can be maintained at a higher value. Therefore, in regard to a separation element, such as a photocoupler for electrically separating an analog circuit and a digital circuit from one another, the operational frequency can be lowered (low speed), and thereby simplified and lower cost parts can be used for the separation element. In addition, the design of a circumferential circuit can be facilitated.

A third embodiment of the present invention relates to an exposure apparatus of an optical disc master plate in relation to the above-noted first or second embodiments, in which the wobble signal generating circuit includes a waveform data memory for storing the waveform data of plural-waveforms of an exposing signal, wherein at least one of the plural waveform data stores plural exposure signals with different phases. A D/A converting circuit converts the waveform data output from the waveform data memory from a digital signal to an analog signal and generating the wobble signal. A selector selects the waveform data output from the waveform data memory.

Consequently, even in a case where a shift of an optical axis occurs in the exposing light beam respectively based on the wobble signal and the land pre-pit signal, plural waveform data signals can be stored with different phases, and the necessary data to be used can be selected from among those plural waveform data signals. Therefore, the difficulties associated with adjusting the optical axis may be eliminated, and thereby the adjustment of the track wobble phase and the land pre-pit forming position can be facilitated.

A fourth embodiment of the present invention relates to an exposure apparatus of an optical disc master plate in relation to either one of the above-noted first, second and third embodiments, in which the exposure apparatus of an optical disc master plate further includes a unit for judging a land pre-pit position for obtaining an arrangement scheduling position of a land pre-pit in the radial position. Further, an overlap position is judged for obtaining a position where the land pre-pit overlaps in the radial direction of the photoresist master plate from the overlapping position of the land pre-pit thus obtained, and an overlap for designating the exposure position of the land pre-pit is avoided such that the overlapping of the land pre-pits upon each other can be avoided between the tracks of the photoresist master plate adjacent to one another in the radial direction, from the position thus obtained.

Consequently, if the positional information regarding the exposure position of the photoresist master plate is acquired from the apparatus which laterally moves the disc, in the case of performing the exposure on the spiral track with the CLV method, the scheduled position of the land pre-pit arrangement can be known. Therefore, it may be possible to avoid an overlap between the land pre-pits without adding a special circuit, etc.

A fifth embodiment of the present invention relates to an exposure apparatus of an optical disc master plate in relation to either one of the above-noted first, second and third embodiments, in which the exposure apparatus of an optical disc master plate further includes a 2-sync.-frame counter for counting the length of a 2-sync.-frame formed on the photoresist master plate with a clock employed as the basic clock signal. A unit is provided for judging a phase difference for taking in a count value counted by the 2-sync.-frame counter for each revolution of the photoresist master plate and obtaining the phase difference between the tracks adjacent to one another in the radial direction of the photoresist master plate from the count value thus obtained, an overlap for designating the exposing position of the land pre-pit is avoided such that the overlapping of the land pre-pits upon each other can be avoided between the adjacent tracks of the photoresist master plate in the radial direction, from the phase difference thus obtained.

Consequently, by knowing the phase difference between the tracks adjacent to one another in the radial direction of the photoresist master plate from the count value of the 2-sync.-frame length for each revolution of the photoresist master plate during the exposure, the occurrence of an overlap between the land pre-pits can be judged advance, and thereby avoided.

A sixth embodiment of the present invention relates to an exposure apparatus of an optical disc master plate in relation to the above-noted fifth embodiment, in which the phase difference judging unit takes in the count value counted by the 2-sync.-frame counter on the plural positions of the photoresist master plate in the circumferential direction and obtains the phase difference between the tracks adjacent to one another in the radial direction of the photoresist master plate on the respective plural positions.

Consequently, since the occurrence of an overlap between the land pre-pit on the plural positions in the circumferential direction of the photoresist master plate can be judged in advance, the overlap can be avoided more precisely.

A seventh embodiment of the present invention relates to an exposure apparatus of an optical disc master plate in relation to either one of the above-noted first, second and third embodiments, in which the exposure apparatus of an optical disc master plate further includes a clock counter for performing a count operation for each revolution of the photoresist master plate with a desired clock signal. A unit is provided for judging a land pre-pit position for taking in the above count value for each occurrence of the land pre-pit and acquiring the positional information of the photoresist master plate, and an overlap for designating the exposing position of the land pre-pit is avoided such that the overlapping of the land pre-pits upon each other can be avoided between the adjacent tracks of the photoresist master plate in the radial direction, from the positional information thus acquired.

Consequently, since a clock signal other than the basic clock signal can be used; the occurrence of an overlap between the land pre-pits can be avoided with high resolution and high accuracy.

An eighth embodiment of the present invention relates to an exposure apparatus of an optical disc master plate in relation to the above-noted fifth or sixth embodiments, in which an exposure position designating means in the overlap avoiding means includes an evaluation unit for evaluating the variation of the phase difference in relation to tolerable phase difference variation width between adjacent tracks enabling the avoidance of mutual overlapping between the land pre-pits; and a unit for outputting an alarm signal for outputting an exposure alarm signal which indicates an abnormal state or exposure in accordance with the evaluation performed by the evaluation means, when the phase difference variation exceeds the tolerable variation width of the phase difference.

Consequently, an abnormal state of avoiding an overlap between the land pre-pits and an abnormal state of the line velocity of the exposure can be indicated by an alarm.

A ninth embodiment of the present invention relates to an exposure apparatus of an optical disc master plate in relation to either one of the above-noted fifth, sixth, seventh and eighth embodiments, in which the overlap avoiding unit includes a track counter for counting the number of tracks on the photoresist master plate. An approach judging unit judges whether the exposure position approaches onto the position where the land pre-pits mutually overlap to a predetermined extent, from the count value of the track counter and the phase difference obtained by the phase difference judging unit. A number data memory previously stores the data of the number of the tracks on which the land pre-pits are arranged adjacently to one another. An overlap unit judges whether the land pre-pits are located on the position on which the land pre-pits mutually overlap based upon the number data stored in the number data memory and the count value counted by the track counter, when the approach judging unit judges that the exposure position approaches onto the position where the land pre-pits overlap mutually. An exposure position designation unit designates the exposure position of the land pre-pits to avoid the overlap of the land pre-pits on the basis of the above judgment.

Consequently, since it may be possible to intend to avoid the occurrence of an overlap between the land pre-pits based upon the tracks number data and the count number of the track counter, both of which are previously prepared, the operational calculation process for avoiding an overlap can be reduced.

A tenth embodiment of the present invention relates to an exposure apparatus of an optical disc master plate in relation to either one of the above-noted fifth, sixth, seventh and eighth embodiments, in which the overlap avoiding means further includes a comparison unit for comparing a phase difference obtained by the phase difference judging unit with a predetermined threshold value. An overlap judging unit judges whether the land pre-pits are arranged on the position where the land pre-pits overlap mutually, when the phase difference becomes smaller than the threshold value. An exposure position designating unit designates the exposure position of the land pre-pit so as to avoid an overlap on the basis of the above judgment, and an adjustment unit adjusts the magnitude of the threshold value.

Consequently, in the case of judging an overlap between the land pre-pits from the fact that the phase difference obtained by the phase difference judging unit becomes smaller than the threshold value, the rotation speed of the photoresist master plate at the time of performing an exposure actually varies within a certain width determined by the revolution number, environment, load, time-elapsing variation, etc., and varies in accordance with an ideal speed curve. By changing the threshold value corresponding to the variation as mentioned above, an overlap between the land pre-pit can be precisely avoided.

FIG. 1 is a block diagram showing an overall structure of an exposure apparatus 1 for exposing an optical disc master plate in the first embodiment of the present invention. As shown in FIG. 1, a photoresist master plate 3 to be exposed is placed on a turntable 2. The turntable 2 is rotated by a spindle motor 5 (realizing a disc rotating apparatus according to the present invention) which is driven by a spindle motor driver 4. Furthermore, the turntable 2 is moved in the horizontal direction (radial direction of the photoresist master plate 3) by a laterally-conveying motor 7 (realizing an apparatus for laterally-conveying a disc according to the present invention) which is driven by a laterally-conveying motor driver 6. The exposing position on the photoresist master plate 3 is continuously moved as a result of the rotation of the turntable 2 and the horizontal movement of the turntable 2.

An Ar laser generating apparatus 8 can be used as the light source for use in the exposure. The Ar laser 9 emitted from the Ar laser generating apparatus 8 is reflected on a mirror 11. A light modulator is turned on and off by driving an optical modulator driver 12, and thereby the reflected Ar laser is converted to the light signal of the information to be written in the photoresist master plates. An object lens 14 focuses the light in the state of a very fine light spot on the photoresist master plate 3 as the exposing beam.

A formatter 16 (realizing an exposure signal generating apparatus according to the present invention) is a programmable creator for creating the pre-format data. A host computer 15 controls the spindle motor driver 4, the laterally-conveying motor driver 6, the Ar laser generating apparatus 8, the formatter 16, and the optical modulator driver, etc. Namely, the host computer 15 controls the entire portion of the exposure apparatus 1 for exposing the optical disc master piece. A laser scale 17 detects an exposing location of the photoresist master plate 3 in the radial direction. Moreover, although the exposure apparatus 1 for exposing an optical disc master plate performs the pre-format of DVD-R, the exposing light of the optical axis based on the wobble signal and the exposing light of the optical axis based on the land pre-pit signal are radiated onto the photoresist master plate 3 simultaneously and in parallel.

In such a way, the wobble track and the land pre-pit are formed at the same time.

Figure 2:
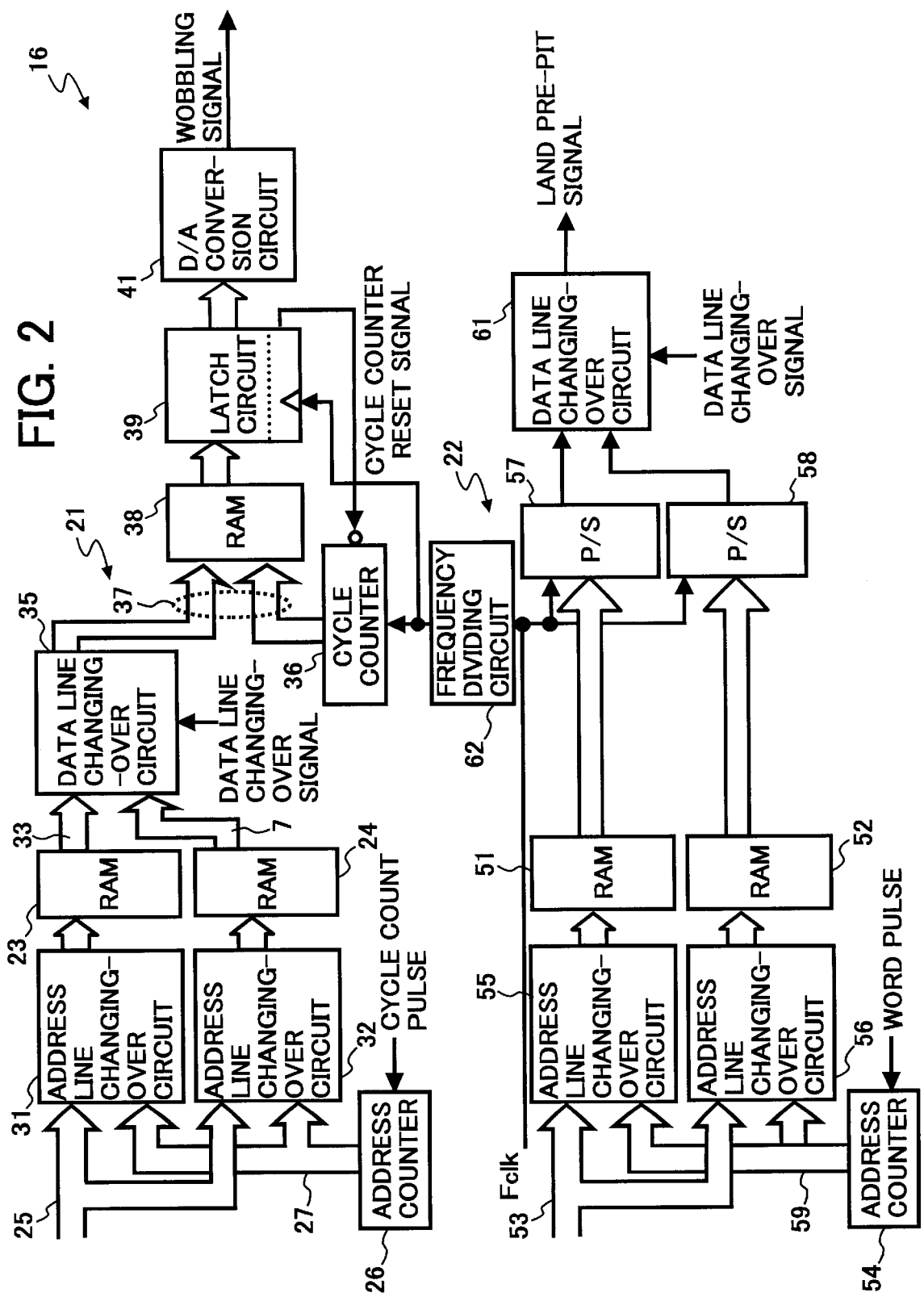
FIG. 2 is a circuit block diagram showing a circuit construction of an exposure signal generating apparatus (formatter) in the above exposure apparatus for exposing an optical disc master plate.

FIG. 2 is a circuit block diagram showing the construction of the formatter 16. As shown in FIG. 2, the formatter includes, broadly, a wobble signal generating circuit 21 and a land pre-pit signal generating circuit 22. The formatter further includes a formatter controller (not shown, but which can be realized by a microcomputer) for controlling the entire portion of the apparatus.

Both the wobble signal generating circuit 21 and the land pre-pit signal generating circuit 22 operate with the same basic clock signal Fclk generated by the same oscillator, etc. The basic clock signal Fclk has a frequency corresponding to the minimum unit of bit construction, that is, one channel bit.

The circuit 21 is the wobble signal generating circuit which is provided with: two waveform selection data RAM s 23 and 24 for storing the selection data of the output waveform data to be output as the wobble signal; an address bus 25 for connecting the waveform selection data RAMs 23 and 24 to the formatter controller (not shown) in regard to the signal to be input to the waveform selection data RAMs 23 and 24; address line changing-over circuits 31 and 32 for changing over the address line between the output lines 27 of the address counter 26 incremented with the cycle count pulse corresponding to the output waveform of the wobble signal per one period; a data line changing-over circuit 35 for changing over the output lines 33 and 34 of the waveform selection data RAMs 23 and 24 with the data line changing-over signal; a waveform data RAM 38 for receiving the plural waveform data per one period output from the waveform selection data RAMs 23 and 24 and the counter control data for resetting the cycle counter 36 from the address line 37 and storing therein the plural waveform data thus received; a latch circuit 39 for latching the data output from the waveform data RAM 38; and a D/A conversion circuit 41 for converting the waveform data latched by the latch circuit 39 to the continuous sinusoidal wobble signal. The D/A conversion circuit 41 is constructed with a photocoupler for insulating the digital signal circuit and the analog signal circuit, a D/A conversion element, and a low-pass filter.

The land pre-pit signal generating circuit 22 is provided with land pre-pit data RAMs 51 and 52 for storing the land pre-pit exposure pattern data; an address bus 53 for connecting the land pre-pit data RAMs 51 and 52 to the formatter controller (not shown) regarding the input signal to the land pre-pit data RAMs 51 and 52; address line changing-over circuits 55 and 56 between the output lines 59 of the address counter 54 incremented with the word pulse corresponding to one word period; parallel/serial conversion circuits 57 and 58 for converting the output parallel data (word length bit) of the land pre-pit data RAMs 51 and 52; and a data line changing-over circuit for changing over the serial signals output from the parallel/serial conversion circuits 57 and 58 with the data line changing-over signal and outputting the land pre-pit signal.

As mentioned before, the wobble signal generating circuit 21 and the land pre-pit signal generating circuit 22 operate with the same basic clock signal Fclk. Namely, the basic clock signal Fclk is input into the cycle counter 36 and the latch circuit 39 of the wobble signal generating circuit 21 and the parallel/serial conversion circuits 57 and 58 in the land pre-pit signal generating circuit 22. The other clock signal frequency-divided by the frequency dividing circuit 62 is input to the cycle counter 36 of the wobble signal generating circuit 21 and the latch circuit 39.

In the above circuit construction, the waveform creating data per one period of plural sorts are stored in the waveform data RAM 38 of the wobble signal generating circuit 21. The address of the waveform data RAM 38 is constructed with the output line data of the cycle counter 36 and the output data of the waveform selection data RAM 23 or 24. For instance, the output line data of the cycle counter is allocated to the lower-rank bit of the address bit, and the output data of the waveform selection data RAM 23 or 24 is allocated to the higher-rank bit of the address bit. The data for resetting the cycle counter 36 is also stored in the waveform data RAM 38. The cycle counter resetting signal is output to the cycle counter 36. The cycle counter 36 successively outputs the waveform data for each period. The cycle count pulse is output to the address counter 26 in synchronism with the end of outputting of the waveform data. At this time, the address counter 26 is counted up. Thereby, the output data of the waveform selection data RAM 23 or 24 to be input, for instance, to the upper-rank address line of the waveform data RAM 38 changes, and then, the desired continuous waveform is generated by the desirably programmed output of the waveform data RAM 38.

Furthermore, the output data of the waveform selection data RAMs 23 and 24 connect the address line of the waveform selection data RAM 23 or 24 which is not connected to the waveform data RAM 38 to the address bus 25, by use of the address line changing-over circuits 31 and 32 and the data line changing-over circuit 35. In such a way, the waveform selection data can always be renewed. Plural waveform data of different periods or plural waveform data of different phases are stored in the waveform data RAM 38 and the waveform selection data are programmed in the waveform selection data RAM s 23 and 24, the frequency-modulated wobble signal or the phase-modulated wobble signal can thus be generated. In the DVD-R, the period of the wobble signal becomes constant. Therefore, it is not necessary to renew the waveform selection data.

In the land pre-pit signal generating circuit 22, the land pre-pit exposing pattern data are stored in the land pre-pit data RAMs 51 and 52 in accordance with the sector format. The output data of the land pre-pit data RAMs 51 and 52 connect the address lines of the land pre-pit data RAMs 51 and 52 not outputting the land pre-pit signal to the address bus, by use of the data line changing-over circuit for changing over the two serial data lines obtained by the address line changing-over circuits 55 and 56 and the parallel/serial conversion circuits 57 and 58. In such a way, the sector data including the land pre-pit exposure pattern data are always renewed in order.

The optical modulator driver 12 drives the optical modulator 13 by the action of the wobble signal output from the wobble signal generating circuit 21 and the land pre-pit signal output from the land pre-pit signal generating circuit 22. Thereby, two lines of the optical axis of the Ar laser 9 are respectively turned on or off individually. In such a way, the wobble track and the land pre-pit are formed on the photoresist master plate 3 simultaneously and in parallel. Since both the wobble signal generating circuit 21 and the land pre-pit signal generating circuit 22 operate in complete synchronism with each other by using the same basic clock signal Fclk, no phase difference occurs between the wobble signal and the land pre-pit signal.

On such an occasion, since the frequency-divided clock signal created by dividing the basic clock signal Fclk with the frequency dividing circuit 62 is input to the wobble signal generating circuit 21, the operational frequency of the wobble signal generating circuit 21 can be lowered. Thereby, the operational frequency of the photo-coupler and the D/A conversion element constructing the D/A conversion circuit 41 can be also lowered. Therefore, simple and low-cost parts can be used for those elements, and the circumferential circuit thereof can be also constructed with simple parts.

Furthermore, in the above-mentioned circuit construction, it is possible to create the programmable wobble waveform with the same circuit construction, regardless of the wobble signal of the FM-modulated sinusoidal wave having the contents of the wobble signal of the constant-period sinusoidal wave in the DVD-R or the ATIP information in the CD-R (address information, disc information, etc. are written in on the frequency-modulated wobble track).

Figure 3:
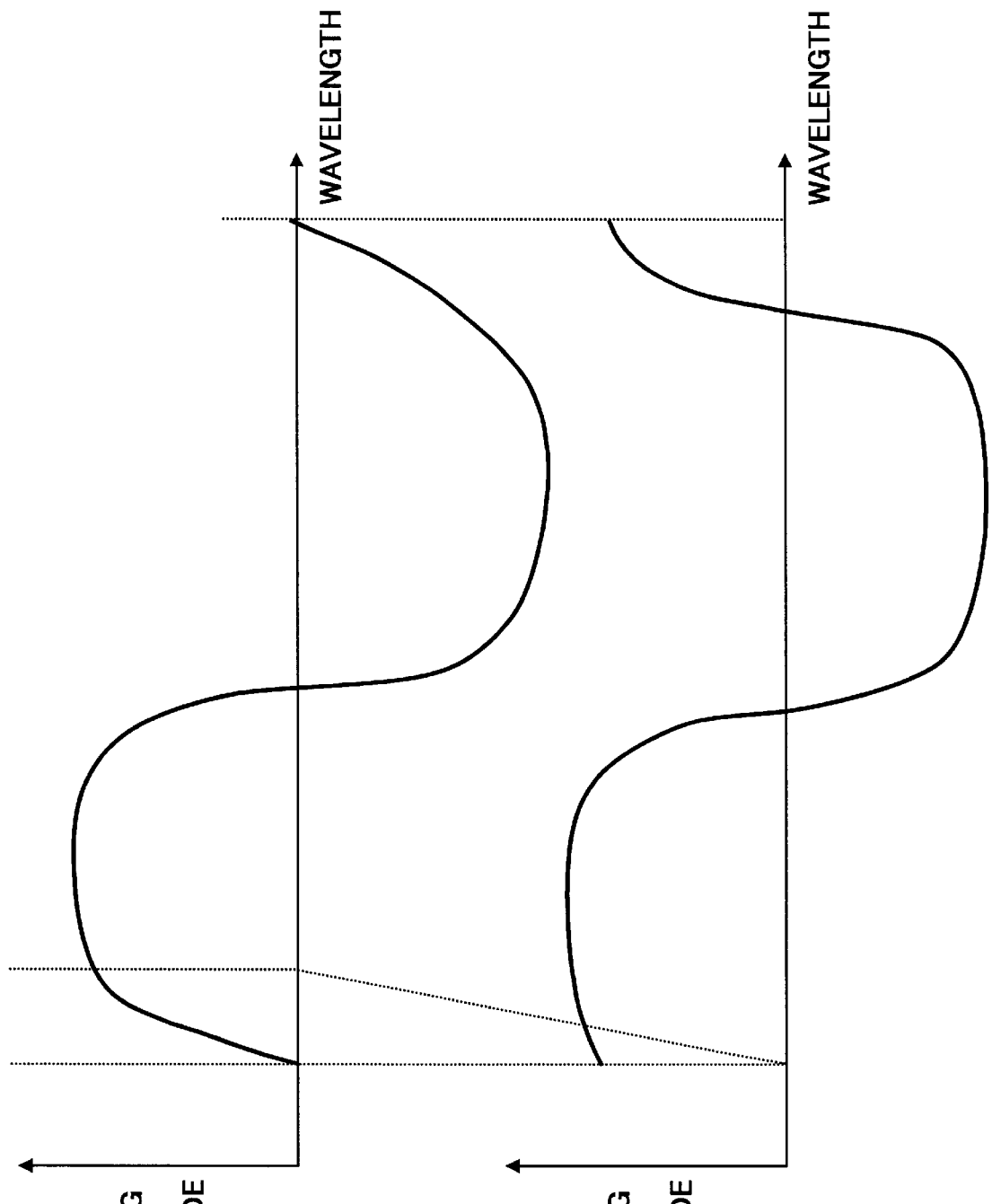
FIGS. 3A and 3B are graphs showing the relationship between the wavelength and amplitude of a wobble signal.

Furthermore, the cycle counter 36 and the parallel/serial conversion circuits 57 and 58 can start the operation thereof in synchronism with the signal output starting signal. Consequently, if the waveform data to be stored in the waveform data RAM 38 are stored with different phases of the sinusoidal wave of same period as shown by the waveform in FIGS. 3A and 3B (θ in the example of FIG. 3), the land pre-pit signal and the wobbling signal can be output with the respective phases different from each other by selecting either one of the signals. The selecting means of the present invention can be realized in such a manner. Consequently, it is possible to perform precise phase adjustment of the wobble signal and the land pre-pit signal. On such an occasion, an example of the waveform data memory apparatus according to the present invention is realized by a waveform data RAM 38, while an example of the selection circuit of the invention is realized by a data line changing-over circuit 25, etc.

Hereupon, on a spiral track of equal (uniform) pitch, assuming that the length of the line path of the n-th track (n=1,2,3 . . . ) is Ln, the length Ln can be obtained by the following equation (1):

$$Ln=2\times\pi\times RO+(2\times n-1)\times\pi\times P \qquad (1).$$

Here, RO is the starting radius of the spiral track, n is the number of the tracks, and P is the spiral pitch.

The length of the line path of the respective tracks increases by "$2\times\pi\times P$" track by track in the case of drawing a spiral from the inner circumference to the outer circumference of the photoresist master plate 3. Furthermore, when the CLV-method exposure is performed, the straight line velocity is always keep constant. Moreover, since the land pre-pit signal also occurs at a constant period, if the radial position starting the outputting of the land pre-pit signal, that is, the position of the photoresist master plate 3 in the radius direction, is known, the position planned to form the land pre-pit a on the spiral line can be precisely calculated.

Here, the arrangement of the land pre-pits "a" between the adjacent tracks is calculated in order, from the data of the exposure beam's radial position at the point in time point outputting of the land pre-pit signal starts, the exposing pitch, and the period length of the land pre-pit "a". Thereby, the overlap of the land pre-pit "a" can be avoided. Namely, the exposure apparatus 1 of the optical disc master plate controls the exposing position information with the host computer 15. Here, the formatter controller (not shown) acquires the radial position information at the point in time outputting of the land pre-pit signal from the host computer 15 starts, and the position planned to form the land pre-pit "a" is obtained during the exposure. Thereby, the judgment means for judging the land pre-pit position of the present invention is realized. Thereafter, the operational calculation seeking the position for the land pre-pit in relation to overlap is performed, and thereby the other judgment means for judging the overlap position of the present invention is also realized. The land pre-pit signal generating circuit 22 is controlled and an overlap of the land pre-pit is avoided. Thereby, an example of an overlap avoiding unit of the present invention is realized. As mentioned previously, such an avoiding operation is done by changing the position between the even position and the odd position both established at the head portion of each of two 1-sync.-frame lengths (see FIG. 4).

Moreover, the calculation seeking the position for the land pre-pit to overlap is performed, and the data of the position of forming the land pre-pit "a" are previously formed. It may be allowed that, on the basis of such data, the overlap of the land pre-pit is avoided.

In such a way, in the case of exposing the spiral track by the CLV method, if the radial position information of the photoresist master plate 3 is acquired from the host computer 15, since the position planned to arrange the land pre-pit is known, the mutual overlap between the land pre-pits can be avoided, without adding a special circuit, etc.

Figure 5:
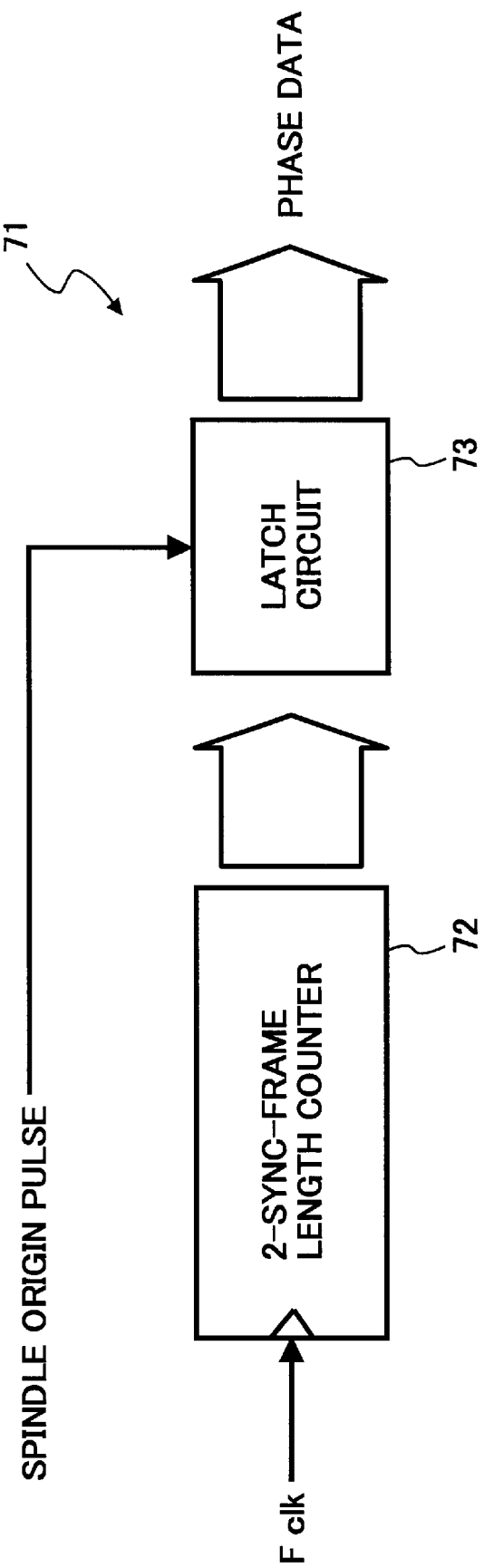
FIG. 5 is a block diagram of a phase reading-out circuit of an exposure apparatus for exposing an optical disc master plate in a second embodiment of the present invention.

The master plate exposing apparatus 1 of an optical disc concerning the second embodiment of the present invention is the same as that of the first embodiment, except for the matter of adding a phase read-out circuit 71 as shown in FIG. 5 to the formatter 16. The same reference numerals or symbols are respectively attached to the common portions, and a detailed description thereof is omitted.

As shown in FIG. 5, a 2-sync.-frame length counter 72 is the counter for repeatedly counting the length of the 2-sync.-frame with the basic clock Fclk. A latch circuit 73 latches the count value counted by the 2-sync.-frame length counter 72 upon inputting of the spindle origin pulse with the clock signal which is the spindle origin pulse output for each revolution of the spindle motor 5. The latch circuit 73 further outputs the latched count data to a controller (not shown) in FIG. 5 as the phase data, and further detects an overlap thereof from the phase difference between the adjacent tracks taken in on the position of the spindle origin pulse output of the count value courted by the 2-sync.-frame length counter 72. An overlap occurs when the phase difference becomes less than two times the land pre-pit length. In practice, it is preferable to set the judgment value with a margin (sufficient value), in order to avoid a misjudgment occurring due to the fact that the taking-in of the revolutionary variation of the spindle and the phase difference thereof is performed once for each revolution of the spindle, namely, the case in which an overlap occurs with the timing when the controller (not shown) takes in the phase data from the latch circuit 73.

Figure 6:
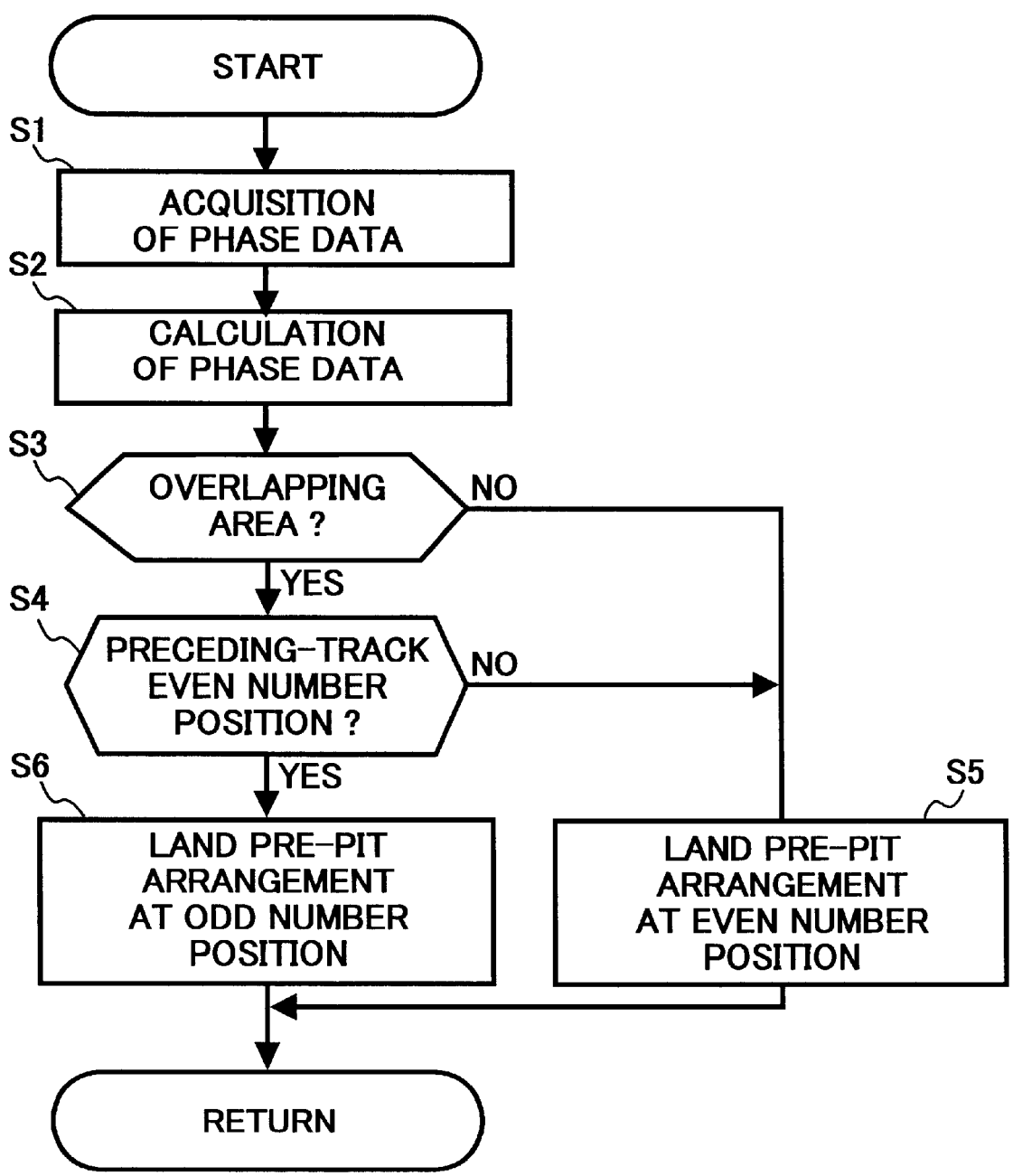
FIG. 6 is a flow chart for illustrating a process of avoiding an overlap between pre-pits by use of an exposure apparatus for exposing an optical disc master plate.

Furthermore, in the second embodiment, it is not always necessary that the phase of the 2-sync.-frame length counter 72 harmonizes with that of the land pre-pit signal actually output at the point in time of the spindle origin pulse. Moreover, the timing of taking in the phase data to the controller (not shown) is not always necessary to be at the point in time the spindle origin pulse is output. It may be allowable that the taking-in timing is optionally on the same position on the circular circumference of the photoresist master plate 3. FIG. 6 is a flow chart illustrating the process of avoiding an overlap of the land pre-pit a by the action of the controller (not shown). As shown in FIG. 6, when the controller (not shown) receives the phase data from the phase read-out circuit 71 (Step S1), the controller calculates the difference between the phase received this time and the phase received the last time (Step S2). In accordance with the phase difference thus calculated, whether or not the present track is in the overlapping area is judged (Step S3). Thereby, the phase difference judging means of the present invention is realized.

Figure 7:
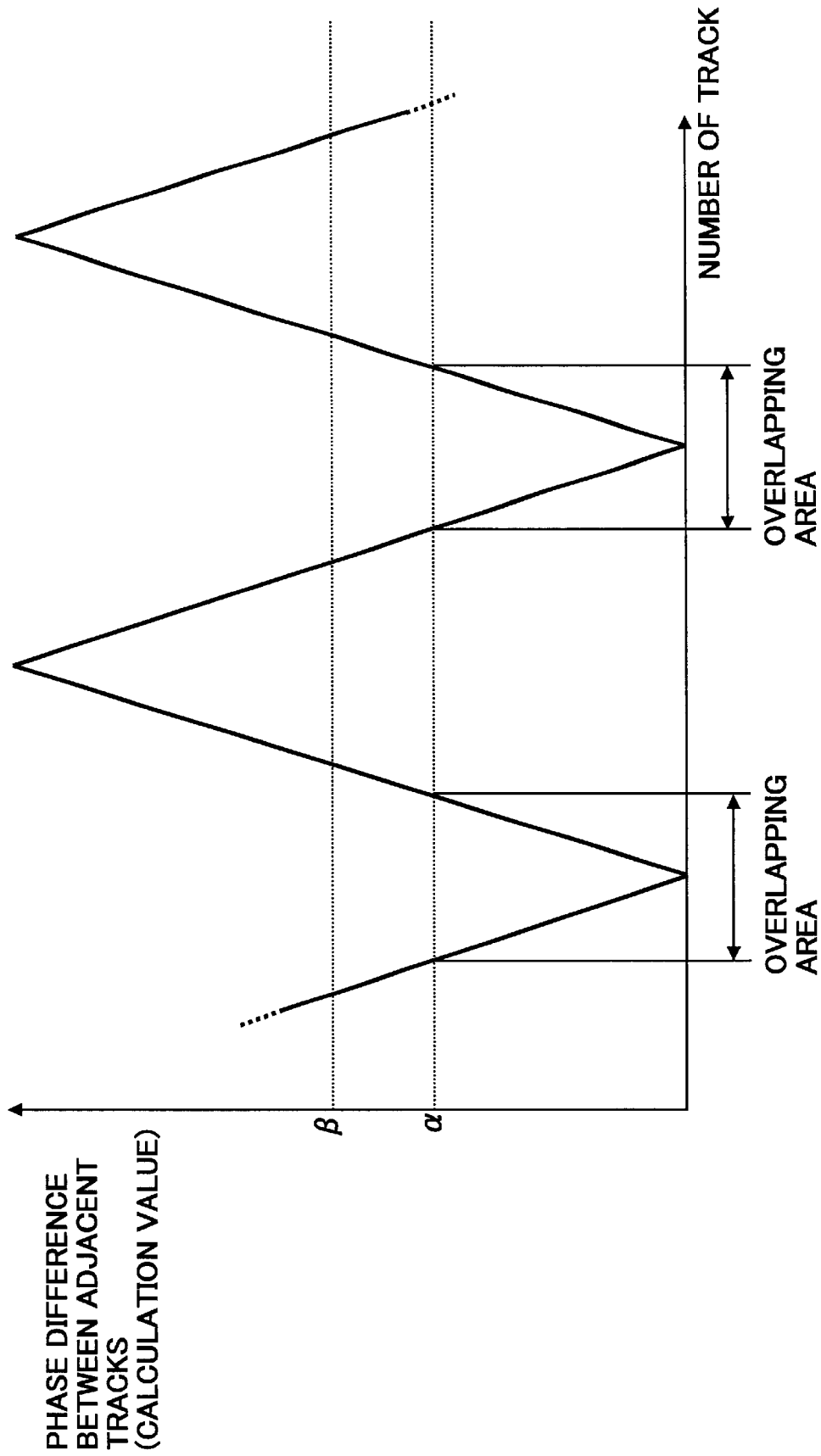
FIG. 7 is a graph for illustrating a relationship between a CD-R track number and a phase difference between adjacent tracks.

FIG. 7 is a graph showing the relationship of the phase difference between the tracks of adjacent track numbers. In FIG. 7, the overlap between the land pre-pits occurs on the track of the track number in which the phase difference between the adjacent tracks becomes smaller than the threshold value $\alpha$. From FIG. 6, the judgment of Step S3 can be performed by determining whether the phase difference calculated in Step S2 becomes smaller than the threshold value $\alpha$. Thereby, the comparing means and the overlap judging means of the present invention is realized.

Figure 4:
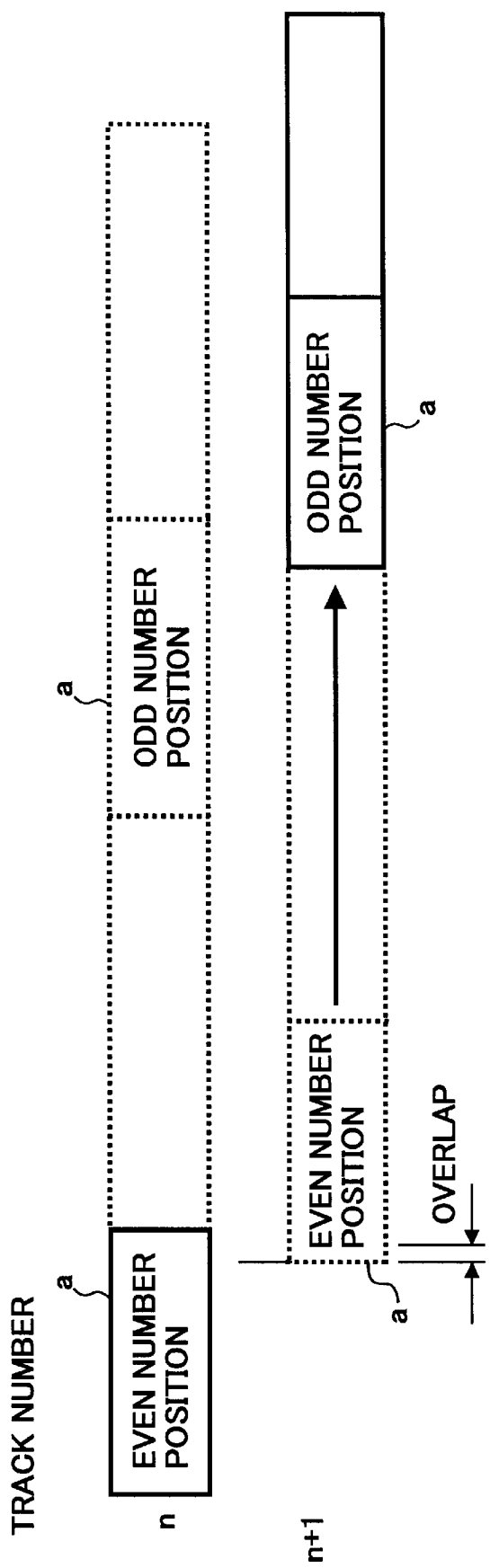
FIG. 4 is a plan view showing the land pre-pits formed by an exposure apparatus for exposing an optical disc master plate.

Furthermore, when the present track is not on an overlapping area at Step S3 (i.e., NO in Step S3), the land pre-pit is formed on the even number position (see FIG. 4 and Step S5). On the contrary, when the present track is on the overlapping area at Step S3 (i.e., YES in step S3), in the case that the immediately previous track takes the even number position as the land pre-pit area (i.e., YES in Step S4), the land pre-pit is formed on the odd number position and thereby an overlap is avoided (see FIG. 4 and Step S6). In the case that the immediately previous track takes the odd number position as the land pre-pit area (i.e., NO in step S4), the land pre-pit is formed on the even number position and thereby an overlap is avoided (see FIG. 4 and Step S5). Thereby, the exposure position designating means of the present invention is realized.

In such a way, in the second embodiment, the phase difference between the tracks adjacent to one another in the radial direction of the photoresist master plate 3 is known from the count value of the 2-sync.-frame length per one revolution of the photoresist master plate 3 during the exposure, and the occurrence of an overlap between the land pre-pits is judged in advance. In such a way, the occurrence of an overlap can be avoided. Thereby, an overlap avoiding unit and operation of the present invention are realized.

Furthermore, as mentioned previously, the judgment of Step S3 from FIG. 6 can be performed by determining whether or not the phase difference calculated in Step S2 becomes lower than the threshold value $\alpha$. In the practical exposure operation, the revolutionary speed of the spindle motor 5 varies in a certain width and the revolutionary speed thereof changes in accordance with an ideal speed curve. The variation width changes according to the revolution number, environment, load, and time-elapsing variation, etc. of the spindle motor 5.

Figure 8:
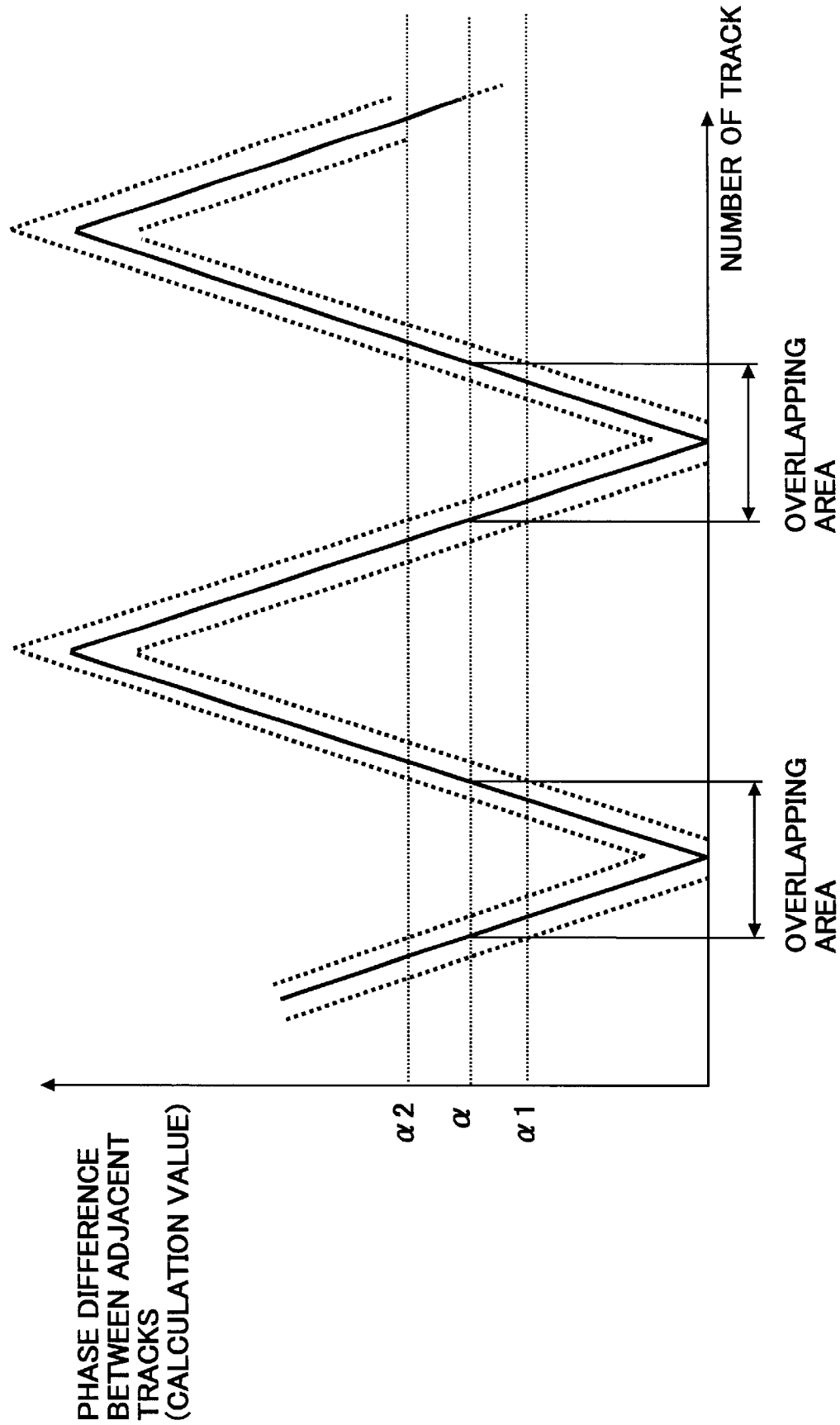
FIG. 8 is another graph for illustrating a relationship between a CD-R track number and a phase difference between adjacent tracks.

Here, in the second embodiment, the controller (not shown) changes the threshold value $\alpha$ in the area of the threshold value $\alpha 1-\alpha 2$, as shown in FIG. 8 in accordance with the revolution speed of the spindle motor 5. Thereby, a threshold adjusting unit and operation of the present invention is realized. The controller thereby further changes the range of the overlap area and enables the countermeasure for the variation of the revolution speed of the spindle motor 5 to be suitably taken. The values of threshold $\alpha 1$ and $\alpha 2$ can be also changed according to the revolution number, environment, load, and time-elapsing variation, etc. of the spindle motor 5.

The master plate exposing apparatus 1 of an optical disc concerning a third embodiment of the present invention sets the phase data taking-in points on the plural circumferential surface points of the photoresist master plate, detects the phase difference therebetween at the phase data taking-in points, and performs an overlap avoiding process and other processes. The operational item except for an overlap avoiding process is the same as that of the second embodiment of the present invention. As to the common operational item, the same reference numeral or symbol is attached to the same part and the detailed explanation thereof is omitted.

Figure 9:
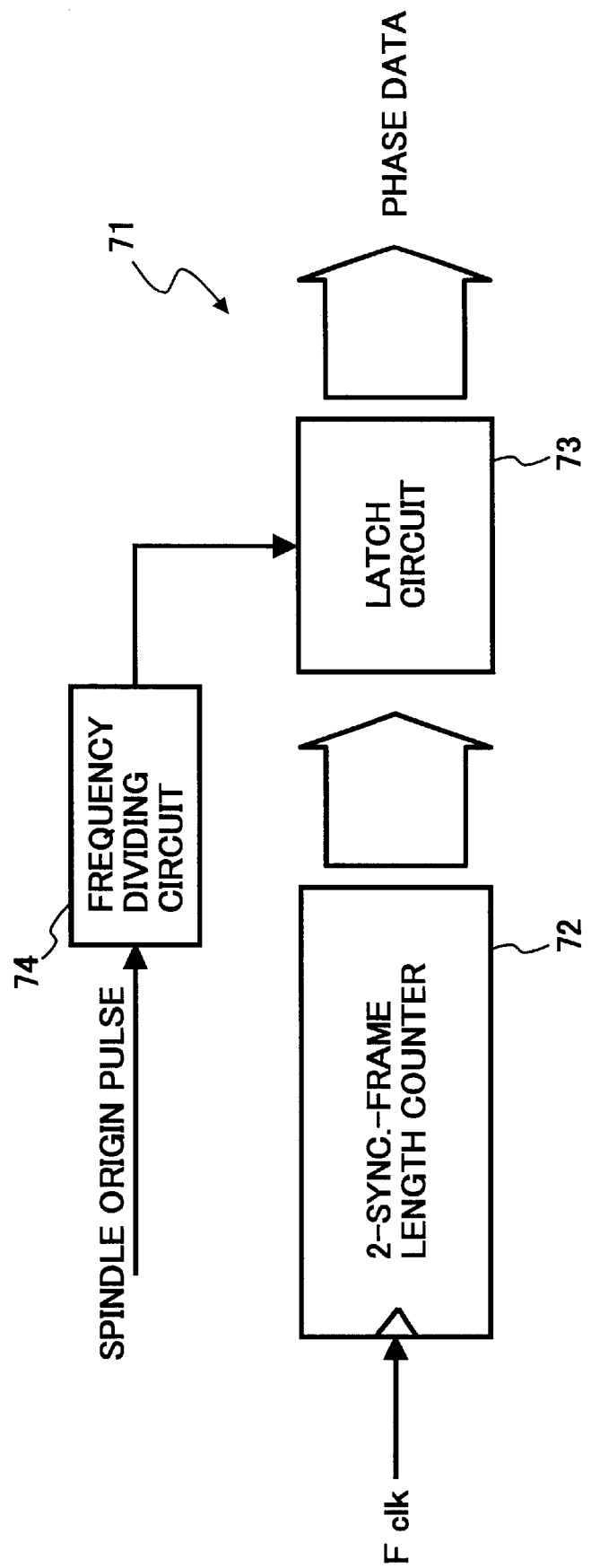
FIG. 9 is a block diagram of a phase read-out circuit of an exposure apparatus for exposing an optical disc master plate in a third embodiment of the present invention.

Stated more concretely, as shown in FIG. 9 for example, it is possible to provide a frequency dividing circuit 74 in the phase read-out circuit 71. The frequency dividing circuit 74 divides the frequency of the spindle encoder pulse showing the rotation angle of the spindle motor 5 and the signal of the frequency thus divided is input to the latch circuit 73 instead of the spindle origin pulse.

In such a way, in the third embodiment, since the occurrence of an overlap between the land pre-pits "a" can be judged in advance on the plural positions on the circumference of the photoresist master plate 3, an overlap can be more precisely avoided.

Figure 10:
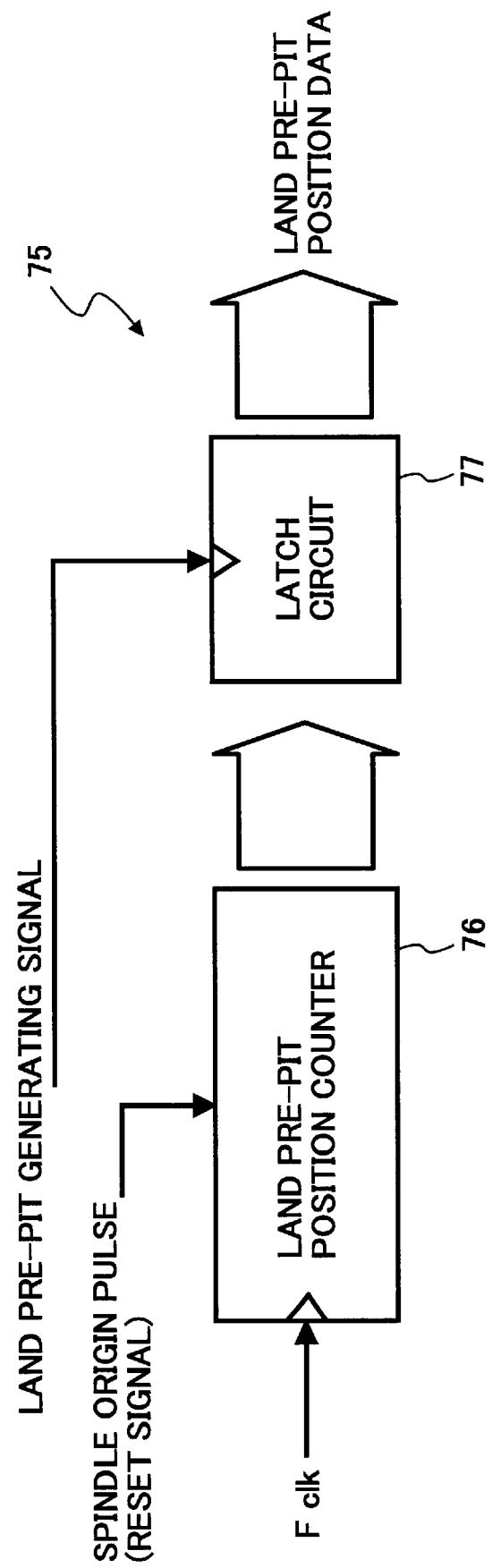
FIG. 10 is a block diagram of a land pre-pit location data read-out circuit of an exposure apparatus for exposing an optical disc master plate in a fourth embodiment of the present invention.

Excluding the structural item that a land pre-pit position data read-out circuit 75, shown in FIG. 10, is added to the formatter 16 instead of the phase read-out circuit 71, shown in FIG. 5, the master plate exposing apparatus 1 of an optical disc concerning the third embodiment of the present invention, the fourth embodiment is the same as the above-noted second embodiment. So, as to the common items, the same reference numerals or symbols are attached to the same part and a detailed explanation thereof is omitted.

As shown in FIG. 10, the land pre-pit position data read-out circuit 75 includes a land pre-pit position courter 76 receiving the spindle origin pulse as the reset signal and counting the clock signal Fclk' having a period shorter than that of the basic clock signal Fclk and a latch circuit 77 for latching the counted value with the timing of the land pre-pit generating signal input. By the land pre-pit position counter 76, an example of the clock counter of the present invention is realized.

Namely, in the fourth embodiment, the count value of the land pre-pit position counter 76 is employed as the co-ordinate value on the circular circumference of the photoresist master plate 3 in order to judge the overlap between the land pre-pits "a".

Regarding the taking-in of the coordinates value, it may be allowable that all of the head (top) position information of the 2-sync.-frame is taken in per 2-sync.-frame and all information thus taken in is compared between the adjacent tracks. However, since the process for judgment increases, it may be allowable to judge and process only the taken-in data in a certain specified coordinates area. Furthermore, it may be allowable to judge the data with the position information of the head position of the physical sector. The land pre-pit generating signal which is a trigger signal for taking in the head position information of the physical sector can be easily obtained from the land pre-pit signal generating circuit 22.

In the fourth embodiment, it may be allowable to use the basic clock signal Fclk. However, the occurrence of the an overlap between the land pre-pits can be avoided with still higher resolution and still higher accuracy, by using the clock signal Fclk' having a period shorter than that of the basic clock Fclk. Thereby, the land pre-pit position data read-out circuit 75 realizes an example of the phase difference judging means. The occurrence of an overlap between the land pre-pits can be avoided with high resolution and high accuracy.

Figure 11:
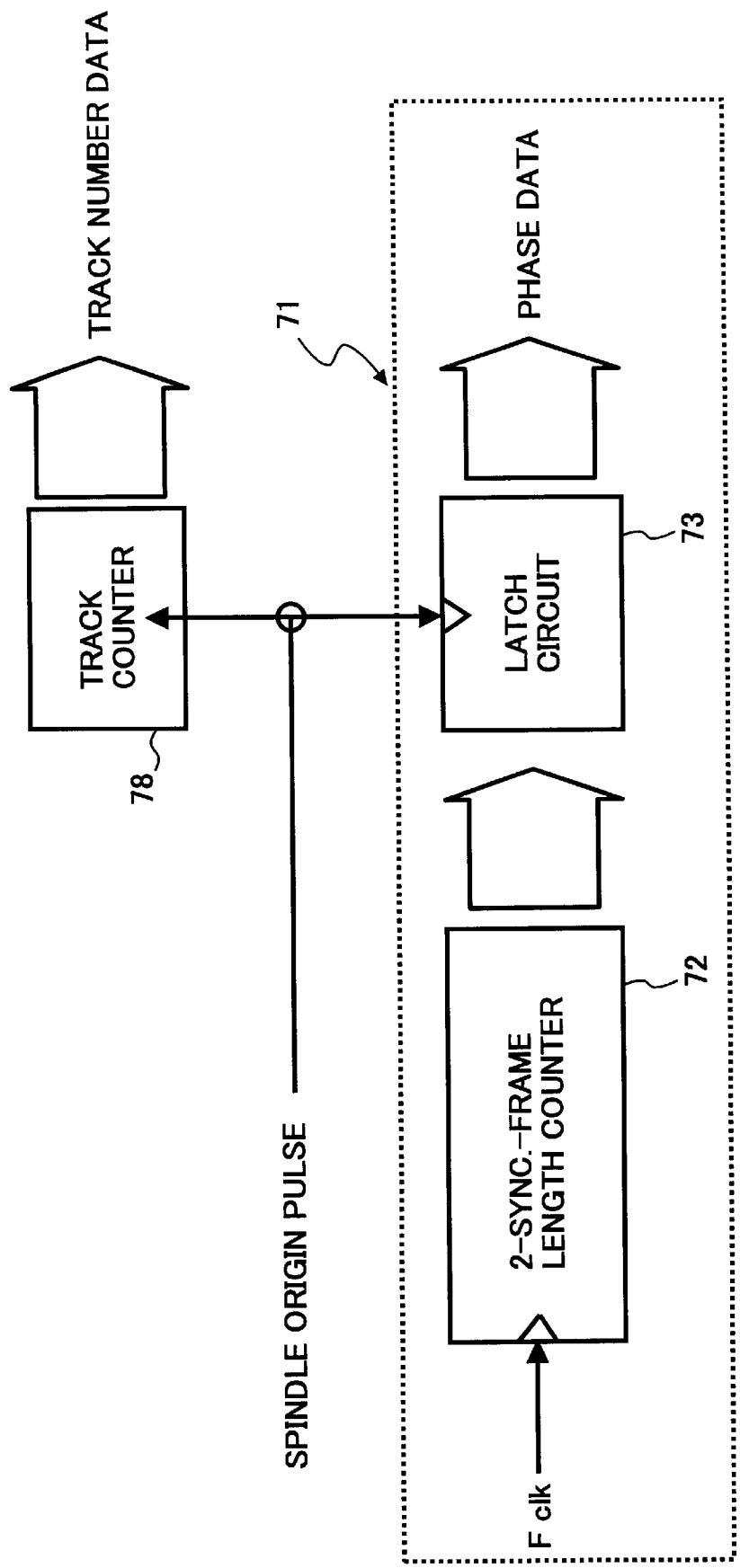
FIG. 11 is a block diagram of a track counter and a circumferential circuit of an exposure apparatus for exposing an optical disc master plate in a fifth embodiment of the present invention.

As shown in FIG. 11, excluding the structural item that a track counter 78 is added to the formatter 16, the master plate exposing apparatus 1 of an optical disc relating to the fifth embodiment of the present invention is the same as that of the second, third, or fourth embodiment. As to the common structural items, the same reference numerals or symbols are attached to the same parts and a detailed description is omitted.

As shown in FIG. 11, the track counter 78 counts the number of tracks and outputs the counted value as the tracks number data to a controller (not shown). Although an example of the phase read-out circuit 71 of the second embodiment shown in FIG. 5 is shown in FIG. 11, the same phase read-out circuit 71 of the third embodiment as shown in FIG. 9 or the same land pre-pit position data read-out circuit 75 of the fourth embodiment as shown in FIG. 10 could be used.

In the fifth embodiment, firstly the controller (not shown) acquires the phase data and the land pre-pit position data from the phase read-out circuit 71 and the land pre-pit position data read-out circuit 75, and then the controller judges whether or not both of the land pre-pits approach an overlapping area to a predetermined extent. Thereby, an approach judging unit and operation of the present invention is realized. For instance, in FIG. 6, when the phase difference between the adjacent tracks becomes smaller than a value β, it is possible to judge that the land pre-pits approach to a predetermined extent. Thereafter, the judgment of whether or not the pre-pits are in the overlap area as shown in the second through fourth embodiments is not performed at all. Instead, the overlap area width (number of the tracks) is previously calculated from the exposing groove pitch and the 2-sync,-frame length, and the calculated value is memorized in (a ROM of) the controller (not shown). Thereby, an example of the number data memory unit and operation of the present invention is realized.

The judgment of whether or not the land pre-pits are in the overlap area is performed from the overlap area width and the count value of the track counter 78. Thereby, an overlap judging unit and operation of the present invention is realized.

Furthermore, by use of the same structures as in the second through fourth embodiments, the overlap between the land pre-pits is avoided. Thereby, the exposure position designating means of the present invention is realized.

Consequently, since the avoiding of an overlap between the land pre-pits can be intended on the basis of both previously a prepared tracks number data and the counted number of the track counter, the operational calculation process of avoiding an overlap can be reduced during the exposure.

Figure 12:
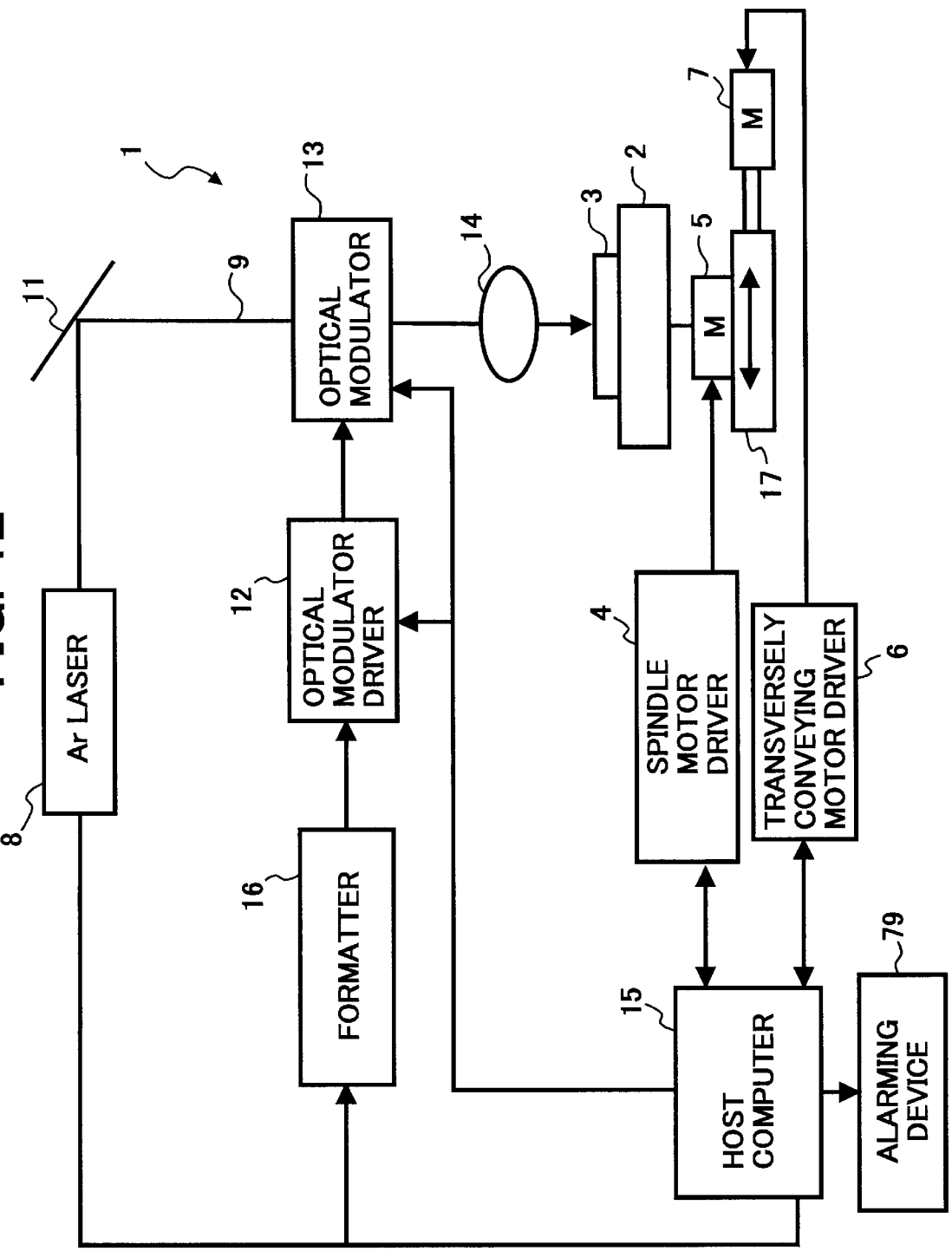
FIG. 12 is a block diagram showing an overall outline of an exposure apparatus for exposing an optical disc master plate in a sixth embodiment of the present invention.
Figure 13:
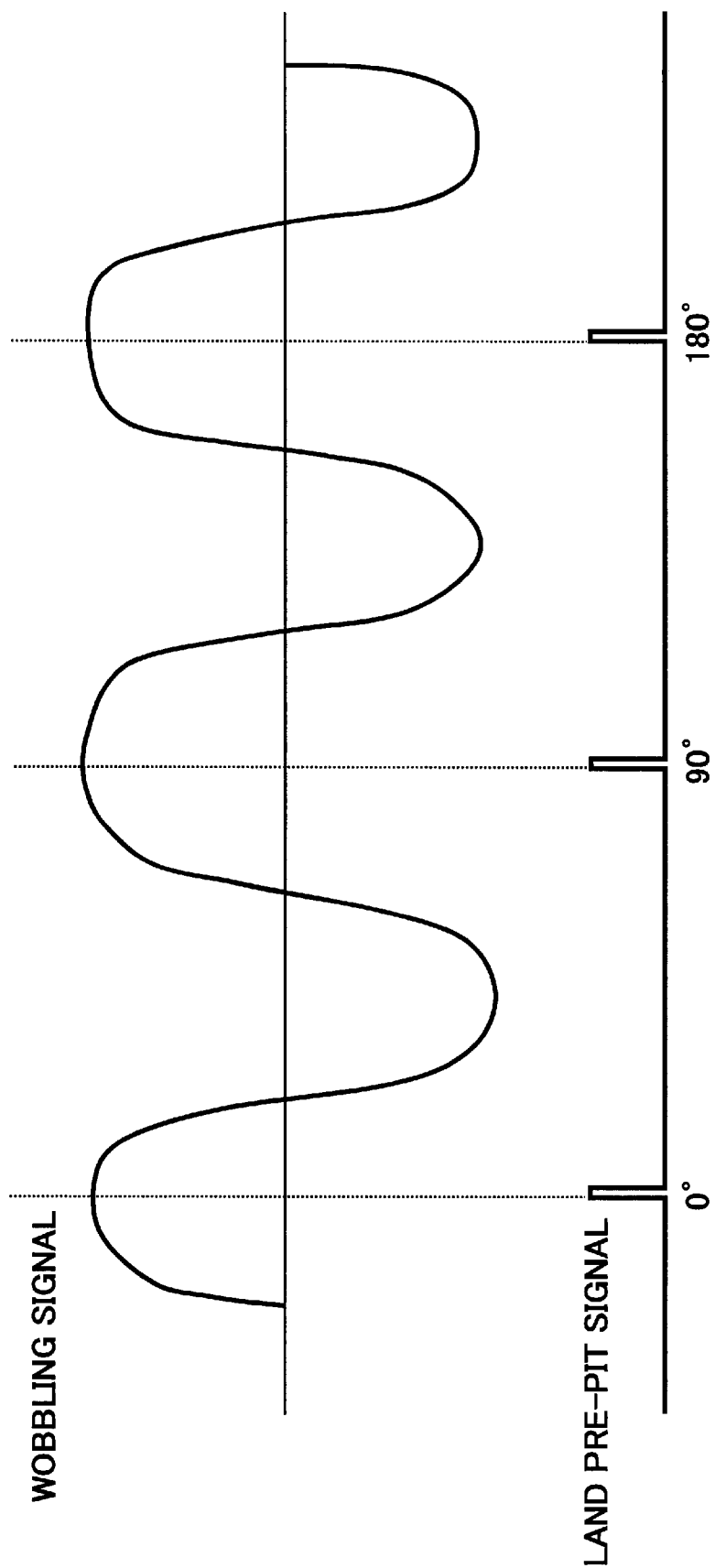
FIG. 13 is a graph (timing chart) showing a relationship of a phase between a land pre-pit signal and a wobble signal.
Figure 14:
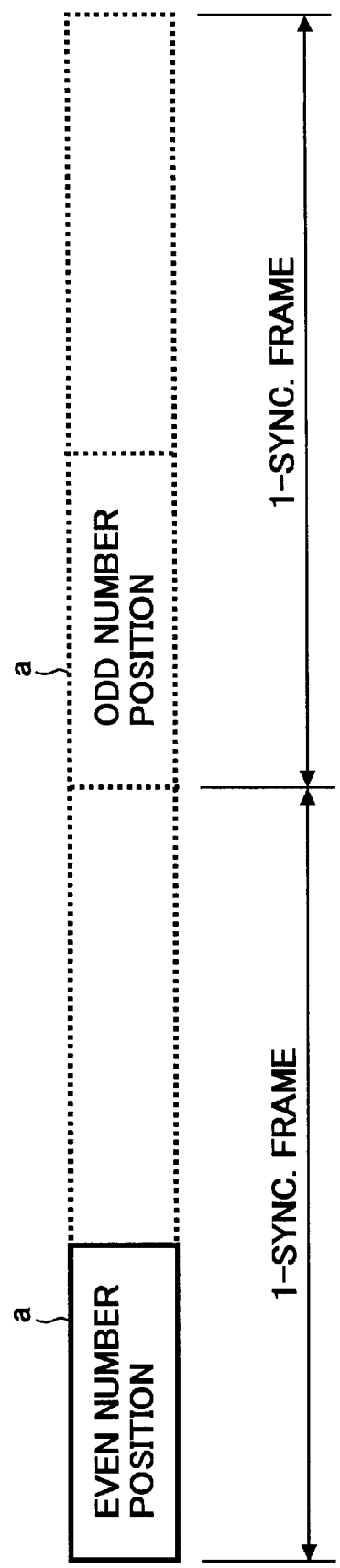
FIG. 14 is a plan view (arrangement) showing the arrangement of a land pre-pits formed by an exposure apparatus for exposing an optical disc master plate per 2-sync.-frame of CD-R.

As shown in FIG. 12, excluding the structural item that an alarming apparatus 79 is added, the master plate exposing apparatus 1 of an optical disc relating to the sixth embodiment of the present invention is the same as that of the second or third embodiments. As to the common items, the same reference numerals or symbols are attached to the same parts, and detailed explanations thereof are omitted.

In the sixth embodiment, a tolerable variation width is set for the phase difference between the adjacent tracks capable of avoiding an overlap between the land pre-pits, or another tolerable variation width is set for the line velocity of exposure. A controller (not shown) evaluates the variation of the phase difference output from the phase read-out circuit 71 for those tolerable variation widths as set forth above. Thereby, the evaluation unit and operation of the present invention are realized. Furthermore, by performing the above evaluation, when the variation of the phase difference exceeds the tolerable variation width of the phase difference or the other tolerable variation width of the line velocity, the controller outputs an exposure abnormal signal for notifying an abnormal state of exposure. Thereby, the abnormal signal outputting unit and operation of the present invention are realized. Subsequently, the host computer 15 sends a control signal to an alarming apparatus 79 upon receiving an abnormal exposure signal and thus provides notice of the existence of an abnormal state of avoiding an overlap between the land pre-pits and the abnormal state of the exposure line velocity to the alarming apparatus 79. A lamp, buzzer or other suitable device can be used as the alarming apparatus 79.

As is apparent from the foregoing description of the above-noted embodiments of the present invention, the wobble signal and the line pre-pit signal can be precisely synchronized and output by the same basic clock.

In the second embodiment of the present invention, even though the operational frequency of the wobble signal generating circuit is suppressed to a low value in relation to the first embodiment, the operational frequency of the overall exposure signal generating apparatus can be maintained at a high value. Therefore, simple and low-cost parts can be used for the separation element, such as photocoupler for electrically separating the analog circuit and the digital circuit as a result of the capability to lower the operational frequency. As the result, the designing of the circumferential circuit may also become simplified.

In the third embodiment of the present invention, even though there occurs an optical axis shift of the exposure beam based respectively on the wobble signal and the land pre-pit signal, the waveform data can be plurally stored with different phases and a desirable one can be selected for use from among those plural waveform data in relation to the first or second embodiments. Consequently, it is not necessary to perform the difficult tasks of adjusting the optical axis and thereby the adjustment of the track wobble phase and the land pre-pit forming position can be facilitated.

In the fourth embodiment of the present invention in relation to either one of the first, second and third embodiments, if the photoresist master plate exposing apparatus acquires the positional information of the exposing position of the photoresist master plate in the radial direction from apparatus for laterally-moving the disc, etc., in the case of performing the exposure on the spiral track with the CLV method, the planned position of arranging the land pre pits. Therefore, it is possible to avoid an overlap between the land pre-pits without further adding a special circuit.

In the fifth embodiment of the present invention in relation to either one of the first, second and third embodiments, the phase difference of the tracks adjacent to one another in the radial direction of the photoresist master plate is known from the count value of the 2-sync,-frame length per one revolution of the photoresist master plate during the exposure. Thereby, the occurrence of an overlap between the land pre-pits can be judged in advance and the occurrence of an overlap can be avoided.

In the sixth embodiment of the present invention in relation to the fifth embodiment, the occurrence of an overlap between the land pre-pits can be judged in advance on the plural positions in the circumferential direction of the photoresist master place. Thereby, an overlap can be precisely avoided.

In the seventh embodiment of the present invention in relation to either one of the first, second and third embodiments, since the clock signal other than the basic clock signal, the occurrence of an overlap between the land pre-pits can be avoided with high resolution and high precision.

In the eighth embodiment of the present invention in relation to the fifth or sixth embodiments, an abnormal state of avoiding an overlap between the land pre-pits and the abnormal line velocity of the exposure can be notified or alarmed.

In the ninth embodiment of the present invention in relation to either one of the fifth, sixth, seventh and eighth embodiments, since the occurrence of an overlap between the land pre-pits can be intended to avoid on the basis of the tracks number data and the count value of the track counter, both of which are previously prepared, the process of the operational calculation of avoiding an overlap can be reduced during the exposure.

In the tenth embodiment of the present invention in relation to either one of the fifth, sixth, seventh and eighth embodiment, in case that an overlap between the land pre-pits is judged by the fact that the phase difference obtained by the phase difference becomes smaller than a threshold value, the rotative velocity at the actual time of exposing the photoresist master plate is determined by the revolution number, environment, load, and time elapsing variation, etc. The threshold value is changed when the rotative velocity changes in accordance with an ideal velocity curve within a certain width of the variation. In such a way, an overlap between the land pre-pits can be precisely avoided.

Obviously, numerous other embodiments and numerous modifications of the present invention are possible in light of the above teachings. It is therefore to be understood that within the scope of the appended claims, the present invention may be practiced otherwise than is specifically described herein.

This application is based on Japanese Patent Application No. JPAP10-002,888/1998 and another Japanese Patent Application No. JAAP10-073,732/1998, respectively filed on Jan. 9, 1998, and on Mar. 23, 1998, the entire contents of which are herein incorporated by reference.

What is claimed is:

1. A method for preparing an optical disc master plate comprising the steps of:
   (a) generating an exposure signal to expose the optical disc master plate;
   (b) emitting laser light based on the exposure signal to expose the optical disc master plate;
   (c) rotating the optical disc master plate and positioning the optical disc master plate in a circumferential direction on a radiation position of the laser light; and
   (d) moving the optical disc maser plate in a radial direction and positioning the optical disc master plate on the radiation position of the laser light in the radial direction,
   wherein said step (a) of generating an exposure signal comprises the substeps of:
      (a1) generating a wobble signal in accordance with a predetermined basic clock signal; and
      (a2) generating a land pre-pit signal in accordance with a basic clock signal.

2. The method for preparing an optical disc master plate as defined in claim 1, wherein said step (a1) of generating a wobble signal comprises the substeps of:
   (a11) dividing a frequency of the basic clock signal; and
   (a12) generating the wobble signal in accordance with a divided signal obtained by the step (a11) of frequency dividing the basic clock signal.

3. The method for preparing an optical disc master plate as defined in claim 1, wherein said step (a1) of generating a wobble signal comprises the substeps of:
   (a11) storing waveform data of plural waveform exposing signals, and for at least one among the plural waveform data, storing plural exposure signals with different phases;
   (a12) selecting waveform data stored in said storing step (a11); and
   (a13) converting the selected waveform data from a digital signal to an analog signal to generate the wobble signal.

4. The method for preparing an optical disc master plate as defined in claim 1, further comprising the steps of:
   (e) obtaining an arrangement scheduling position of a land pre-pit on a radial position;
   (f) obtaining a position where the land pre-pit overlaps in the radial direction of the optical disc master plate from an overlapping position of the land pre-pit; and
   (g) designating the exposing position of the land pre-pit such that the overlapping of the land pre-pits upon each other is avoided between tracks of the optical disc master plate adjacent in the radial direction, from the obtained position.

5. The method for preparing an optical disc master plate as defined in claim 1, further comprising the steps of:
   (e) counting a length of a 2-sync-frame formed on the optical disc master plate with the basic clock signal;

(f) taking in a count value counted by the 2-sync-frame counter for each revolution of the optical disc master plate to obtain a phase difference between tracks adjacent to each other in the radial direction of the optical disc master plate from an obtained count value; and (g) designing an exposing position of the land pre-pit such that an overlapping of the land pre-pits upon each other is avoided between tracks of the optical disc master plate adjacent in the radial direction, from the obtained phase difference.

6. The method for preparing an optical disc master plate as defined in claim 5, wherein said step (f) of taking in a count value takes in a count value of the 2-sync-frame counter on plural positions of the optical disc master plate in a circumferential direction and obtains the phase difference between tracks adjacent to each other in a radial direction of the optical disc master plate on the respective plural positions.

7. The method for preparing an optical disc master plate as defined in claim 5, wherein said step (g) of designating an exposure position comprises the substeps of:

(g1) evaluating a variation of the obtained phase difference with regard to a tolerable variation width of the phase difference between adjacent tracks to avoid mutual overlapping between the land pre-pits; and (g2) outputting an exposure alarm signal to indicate an abnormal state of exposure in accordance with the evaluation, when a variation of the obtained phase difference exceeds a tolerable variation width of the phase difference.

8. The method for preparing an optical disc master plate as defined in claim 5, wherein said step (g) of designating an exposure position comprises the substeps of:

(g1) counting a number of tracks on the optical disc master plate;

(g2) judging an exposure position which approaches to a predetermined extent onto a position where the land pre-pits mutually overlap, from the count of the number of tracks and the obtained phase difference;

(g3) storing data of a number of tracks on which the land pre-pits are arranged adjacently to each other;

(g4) judging that the land pre-pits are located on a position at which the land pre-pits mutually overlap based on the number data stored in step (g3) and the counted number of tracks in step (g1), when judging in step (g2) that an exposure position approaches onto the position where the land pre-pits overlap mutually; and (g5) designating the exposure position of the land pre-pits to avoid an overlap of the land pre-pits based on the judgment in step (g4).

9. The method for preparing an optical disc master plate as defined in claim 8, wherein said step (g) of designating an exposure position comprises the further substeps of:

(g6) comparing the obtained phase difference with a threshold value;

(g7) judging that the land pre-pits are arranged on a position where the land pre-pits overlap mutually, when the obtained phase difference becomes smaller than the threshold value;

(g8) designating the exposure position of the land pre-pit to avoid the overlap based on the judgment in step (g6); and (g9) adjusting the magnitude of the threshold value.

10. The method for preparing an optical disc master plate as defined in claim 5, wherein said step (g) of designating an exposure position comprises the substeps of:

(g1) comparing the obtained phase difference with a threshold value;

(g2) judging that the land pre-pits are arranged on a position where the land pre-pits overlap mutually, when the obtained phase difference becomes smaller than the threshold value;

(g3) designating the exposure position of the land pre-pit to avoid the overlap based on the judgment in step (g2); and (g4) adjusting the magnitude of the threshold value.

11. The method for preparing an optical disc master plate as defined in claim 1, further comprising the steps of:

(e) performing a count for each revolution of the optical disc master plate with a desired clock signal;

(f) taking in the count for each occurrence of the land pre-pit and acquiring positional information of the optical disc master plate; and (g) designating an exposing position of the land pre-pit such that an overlapping of the land pre-pits upon each other is avoided between tracks of the optical disc master plate adjacent in the radial direction from the acquired positional information.

12. An optical disc master plate formed by the process comprising the steps of:

(a) generating an exposure signal to expose the optical disc master plate;

(b) emitting laser light based on the exposure signal to expose the optical disc master plate;

(c) rotating the optical disc master plate and positioning the optical disc master plate in a circumferential direction on a radiation position of the laser light; and (d) moving the optical disc maser plate in a radial direction and positioning the optical disc master plate on the radiation position of the laser light in the radial direction, wherein said step (a) of generating an exposure signal comprises the substeps of:

(a1) generating a wobble signal in accordance with a predetermined basic clock signal; and (a2) generating a land pre-pit signal in accordance with a basic clock signal.

13. An optical disc master plate formed by the process as defined in claim 12, wherein said step (a1) of generating a wobble signal comprises the substeps of:

(a11) dividing a frequency of the basic clock signal; and (a12) generating the wobble signal in accordance with a divided signal obtained by the step (a11) of frequency dividing the basic clock signal.

14. An optical disc master plate formed by the process as defined in claim 12, wherein said step (a1) of generating a wobble signal comprises the substeps of:

(a11) storing waveform data of plural waveform exposing signals, and for at least one among the plural waveform data, storing plural exposure signals with different phases;

(a12) selecting waveform data stored in said storing step (a11); and (a13) converting the selected waveform data from a digital signal to an analog signal to generate the wobble signal.

15. An optical disc master plate formed by the process as defined in claim 12, further comprising the steps of:

(e) obtaining an arrangement scheduling position of a land pre-pit on a radial position;

(f) obtaining a position where the land pre-pit overlaps in the radial direction of the optical disc master plate from an overlapping position of the land pre-pit; and (g) designating the exposing position of the land pre-pit such that the overlapping of the land pre-pits upon each other is avoided between tracks of the optical disc master plate adjacent in the radial direction, from the obtained position.

16. An optical disc master plate formed by the process as defined in claim 12, further comprising the steps of:

(e) counting a length of a 2-sync-frame formed on the optical disc master plate with the basic clock signal;

(f) taking in a count value counted by the 2-sync-frame counter for each revolution of the optical disc master plate to obtain a phase difference between tracks adjacent to each other in the radial direction of the optical disc master plate from an obtained count value; and (g) designing an exposing position of the land pre-pit such that an overlapping of the land pre-pits upon each other is avoided between tracks of the optical disc master plate adjacent in the radial direction, from the obtained phase difference.

17. An optical disc master plate formed by the process as defined in claim 16, wherein said step (f) of taking in a count value takes in a count value of the 2-sync-frame counter on plural positions of the optical disc master plate in a circumferential direction and obtains the phase difference between tracks adjacent to each other in a radial direction of the optical disc master plate on the respective plural positions.

18. An optical disc master plate formed by the process as defined in claim 16, wherein said step (g) of designating an exposure position comprises the substeps of:

(g1) evaluating a variation of the obtained phase difference with regard to a tolerable variation width of the phase difference between adjacent tracks to avoid mutual overlapping between the land pre-pits; and (g2) outputting an exposure alarm signal to indicate an abnormal state of exposure in accordance with the evaluation, when a variation of the obtained phase difference exceeds a tolerable variation width of the phase difference.

19. An optical disc master plate formed by the process as defined in claim 16, wherein said step (g) of designating an exposure position comprises the substeps of:

(g1) counting a number of tracks on the optical disc master plate;

(g2) judging an exposure position which approaches to a predetermined extent onto a position where the land pre-pits mutually overlap, from the count of the number of tracks and the obtained phase difference;

(g3) storing data of a number of tracks on which the land pre-pits are arranged adjacently to each other;

(g4) judging that the land pre-pits are located on a position at which the land pre-pits mutually overlap based on the number data stored in step (g3) and the counted number of tracks in step (g1), when judging in step (g2) that an exposure position approaches onto the position where the land pre-pits overlap mutually; and (g5) designating the exposure position of the land pre-pits to avoid an overlap of the land pre-pits based on the judgment in step (g4).

20. An optical disc master plate formed by the process as defined in claim 19, wherein said step (g) of designating an exposure position comprises the further substeps of:

(g6) comparing the obtained phase difference with a threshold value;

(g7) judging that the land pre-pits are arranged on a position where the land pre-pits overlap mutually, when the obtained phase difference becomes smaller than the threshold value;

(g8) designating the exposure position of the land pre-pit to avoid the overlap based on the judgment in step (g6); and (g9) adjusting the magnitude of the threshold value.

21. An optical disc master plate formed by the process as defined in claim 16, wherein said step (g) of designating an exposure position comprises the substeps of:

(g1) comparing the obtained phase difference with a threshold value;

(g2) judging that the land pre-pits are arranged on a position where the land pre-pits overlap mutually, when the obtained phase difference becomes smaller than the threshold value;

(g3) designating the exposure position of the land pre-pit to avoid the overlap based on the judgment in step (g2); and (g4) adjusting the magnitude of the threshold value.

22. An optical disc master plate formed by the process as defined in claim 12, further comprising the steps of:

(e) performing a count for each revolution of the optical disc master plate with a desired clock signal;

(f) taking in the count for each occurrence of the land pre-pit and acquiring positional information of the optical disc master plate; and (g) designating an exposing position of the land pre-pit such that an overlapping of the land pre-pits upon each other is avoided between tracks of the optical disc master plate adjacent in the radial direction from the acquired positional information.

23. An optical disc substrate formed by the process comprising the steps of:

(a) forming an optical disc plate by (a1) generating an exposure signal to expose the optical disc master plate;

(a2) emitting laser light based on the exposure signal to expose the optical disc master plate;

(a3) rotating the optical disc master plate and positioning the optical disc master plate in a circumferential direction on a radiation position of the laser light; and (a4) moving the optical disc maser plate in a radial direction and positioning the optical disc master plate on the radiation position of the laser light in the radial direction, wherein said step (a1) of generating an exposure signal comprises the substeps of:

(a11) generating a wobble signal in accordance with a predetermined basic clock signal; and (a12) generating a land pre-pit signal in accordance with a basic clock signal;

(b) forming a stamp by spattering and electroforming said formed optical disc; and (c) injection molding an optical disc substrate using the formed stamp.

24. An optical disc substrate formed by the process as defined in claim 23, wherein said step (a11) of generating a wobble signal comprises the substeps of:

(a111) dividing a frequency of the basic clock signal; and (a112) generating the wobble signal in accordance with a divided signal obtained by the step (a111) of frequency dividing the basic clock signal.

25. An optical disc substrate formed by the process as defined in claim 23, wherein said step (a11) of generating a wobble signal comprises the substeps of:
   (a111) storing waveform data of plural waveform exposing signals, and for at least one among the plural waveform data, storing plural exposure signals with different phases;
   (a112) selecting waveform data stored in said storing step (a111); and
   (a113) converting the selected waveform data from a digital signal to an analog signal to generate the wobble signal.

26. An optical disc substrate formed by the process as defined in claim 23, wherein said step (a) of forming the optical disc plate further comprises the steps of:
   (a5) obtaining an arrangement scheduling position of a land pre-pit on a radial position;
   (a6) obtaining a position where the land pre-pit overlaps in the radial direction of the optical disc master plate from an overlapping position of the land pre-pit; and
   (a7) designating the exposing position of the land pre-pit such that the overlapping of the land pre-pits upon each other is avoided between tracks of the optical disc master plate adjacent in the radial direction, from the obtained position.

27. An optical disc substrate formed by the process as defined in claim 23, wherein said step (a) of forming the optical disc plate firther comprises the steps of:
   (a5) counting a length of a 2-sync-frame formed on the optical disc master plate with the basic clock signal;
   (a6) taking in a count value counted by the 2-sync-frame counter for each revolution of the optical disc master plate to obtain a phase difference between tracks adjacent to each other in the radial direction of the optical disc master plate from an obtained count value; and
   (a7) designing an exposing position of the land pre-pit such that an overlapping of the land pre-pits upon each other is avoided between tracks of the optical disc master plate adjacent in the radial direction, from the obtained phase difference.

28. An optical disc substrate formed by the process as defined in claim 27, wherein said step (a6) of taking in a count value takes in a count value of the 2-sync-frame counter on plural positions of the optical disc master plate in a circumferential direction and obtains the phase difference between tracks adjacent to each other in a radial direction of the optical disc master plate on the respective plural positions.

29. An optical disc substrate formed by the process as defined in claim 27, wherein said step (a7) of designating an exposure position comprises the substeps of:
   (a71) evaluating a variation of the obtained phase difference with regard to a tolerable variation width of the phase difference between adjacent tracks to avoid mutual overlapping between the land pre-pits; and
   (a72) outputting an exposure alarm signal to indicate an abnormal state of exposure in accordance with the evaluation, when a variation of the obtained phase difference exceeds a tolerable variation width of the phase difference.

30. An optical disc substrate formed by the process as defined in claim 27, wherein said step (a7) of designating an exposure position comprises the substeps of:
   (a71) counting a number of tracks on the optical disc master plate;
   (a72) judging an exposure position which approaches to a predetermined extent onto a position where the land pre-pits mutually overlap, from the count of the number of tracks and the obtained phase difference;
   (a73) storing data of a number of tracks on which the land pre-pits are arranged adjacently to each other;
   (a74) judging that the land pre-pits are located on a position at which the land pre-pits mutually overlap based on the number data stored in step (a7) and the counted number of tracks in step (a71), when judging in step (a72) that an exposure position approaches onto the position where the land pre-pits overlap mutually; and
   (a75) designating the exposure position of the land pre-pits to avoid an overlap of the land pre-pits based on the judgment in step (a74).

31. An optical disc substrate formed by the process as defined in claim 30, wherein said step (a7) of designating an exposure position comprises the further substeps of:
   (a76) comparing the obtained phase difference with a threshold value;
   (a77) judging that the land pre-pits are arranged on a position where the land pre-pits overlap mutually, when the obtained phase difference becomes smaller than the threshold value;
   (a78) designating the exposure position of the land pre-pit to avoid the overlap based on the judgment in step (a72); and
   (a79) adjusting the magnitude of the threshold value.

32. An optical disc substrate formed by the process as defined in claim 27, wherein said step (a7) of designating an exposure position comprises the substeps of:
   (a71) comparing the obtained phase difference with a threshold value;
   (a72) judging that the land pre-pits are arranged on a position where the land pre-pits overlap mutually, when the obtained phase difference becomes smaller than the threshold value;
   (a73) designating the exposure position of the land pre-pit to avoid the overlap based on the judgment in step (a72); and
   (a74) adjusting the magnitude of the threshold value.

33. An optical disc substrate formed by the process as defined in claim 23, wherein said step (a) of forming the optical disc plate further comprises the steps of:
   (a5) performing a count for each revolution of the optical disc master plate with a desired clock signal;
   (a6) taking in the count for each occurrence of the land pre-pit and acquiring positional information of the optical disc master plate; and
   (a7) designating an exposing position of the land pre-pit such that an overlapping of the land pre-pits upon each other is avoided between tracks of the optical disc master plate adjacent in the radial direction from the acquired positional information.

34. An optical disc stamp formed by the process comprising the steps of:
   (a) forming an optical disc plate by
      (a1) generating an exposure signal to expose the optical disc master plate;
      (a2) emitting laser light based on the exposure signal to expose the optical disc master plate;
      (a3) rotating the optical disc master plate and positioning the optical disc master plate in a circumferential direction on a radiation position of the laser light; and (a4) moving the optical disc maser plate in a radial direction and positioning the optical disc master plate on the radiation position of the laser light in the radial direction,
wherein said step (a1) of generating an exposure signal comprises the substeps of:
(a11) generating a wobble signal in accordance with a predetermined basic clock signal; and
(a12) generating a land pre-pit signal in accordance with a basic clock signal;
(b) forming a stamp by spattering and electroforming said formed optical disc.

35. An optical disc stamp formed by the process as defined in claim 34, wherein said step (a11) of generating a wobble signal comprises the substeps of:
(a111) dividing a frequency of the basic clock signal; and
(a112) generating the wobble signal in accordance with a divided signal obtained by the step (a111) of frequency dividing the basic clock signal.

36. An optical disc stamp formed by the process as defined in claim 34, wherein said step (a11) of generating a wobble signal comprises the substeps of:
(a111) storing waveform data of plural waveform exposing signals, and for at least one among the plural waveform data, storing plural exposure signals with different phases;
(a112) selecting waveform data stored in said storing step (a111); and
(a113) converting the selected waveform data from a digital signal to an analog signal to generate the wobble signal.

37. An optical disc stamp formed by the process as defined in claim 34, wherein said step (a) of forming the optical disc plate further comprises the steps of:
(a5) obtaining an arrangement scheduling position of a land pre-pit on a radial position;
(a6) obtaining a position where the land pre-pit overlaps in the radial direction of the optical disc master plate from an overlapping position of the land pre-pit; and
(a7) designating the exposing position of the land pre-pit such that the overlapping of the land pre-pits upon each other is avoided between tracks of the optical disc master plate adjacent in the radial direction, from the obtained position.

38. An optical disc stamp formed by the process as defined in claim 34, wherein said step (a) of forming the optical disc plate further comprises the steps of:
(a5) counting a length of a 2-sync-frame formed on the optical disc master plate with the basic clock signal;
(a6) taking in a count value counted by the 2-sync-frame counter for each revolution of the optical disc master plate to obtain a phase difference between tracks adjacent to each other in the radial direction of the optical disc master plate from an obtained count value; and
(a7) designing an exposing position of the land pre-pit such that an overlapping of the land pre-pits upon each other is avoided between tracks of the optical disc master plate adjacent in the radial direction, from the obtained phase difference.

39. An optical disc stamp formed by the process as defined in claim 38, wherein said step (a6) of taking in a count value takes in a count value of the 2-sync-frame counter on plural positions of the optical disc master plate in a circumferential direction and obtains the phase difference between tracks adjacent to each other in a radial direction of the optical disc master plate on the respective plural positions.

40. An optical disc stamp formed by the process as defined in claim 38, wherein said step (a7) of designating an exposure position comprises the substeps of:
(a71) evaluating a variation of the obtained phase difference with regard to a tolerable variation width of the phase difference between adjacent tracks to avoid mutual overlapping between the land pre-pits; and
(a72) outputting an exposure alarm signal to indicate an abnormal state of exposure in accordance with the evaluation, when a variation of the obtained phase difference exceeds a tolerable variation width of the phase difference.

41. An optical disc stamp formed by the process as defined in claim 38, wherein said step (a7) of designating an exposure position comprises the substeps of:
(a71) counting a number of tracks on the optical disc master plate;
(a72) judging an exposure position which approaches to a predetermined extent onto a position where the land pre-pits mutually overlap, from the count of the number of tracks and the obtained phase difference;
(a73) storing data of a number of tracks on which the land pre-pits are arranged adjacently to each other;
(a74) judging that the land pre-pits are located on a position at which the land pre-pits mutually overlap based on the number data stored in step (a7) and the counted number of tracks in step (a71), when judging in step (a72) that an exposure position approaches onto the position where the land pre-pits overlap mutually; and
(a75) designating the exposure position of the land pre-pits to avoid an overlap of the land pre-pits based on the judgment in step (a74).

42. An optical disc stamp formed by the process as defined in claim 41, wherein said step (a7) of designating an exposure position comprises the further substeps of:
(a76) comparing the obtained phase difference with a threshold value;
(a77) judging that the land pre-pits are arranged on a position where the land pre-pits overlap mutually, when the obtained phase difference becomes smaller than the threshold value;
(a78) designating the exposure position of the land pre-pit to avoid the overlap based on the judgment in step (a76); and
(a79) adjusting the magnitude of the threshold value.

43. An optical disc stamp formed by the process as defined in claim 38, wherein said step (a7) of designating an exposure position comprises the substeps of:
(a71) comparing the obtained phase difference with a threshold value;
(a72) judging that the land pre-pits are arranged on a position where the land pre-pits overlap-mutually, when the obtained phase difference becomes smaller than the threshold value;
(a73) designating the exposure position of the land pre-pit to avoid the overlap based on the judgment in step (a72); and
(a74) adjusting the magnitude of the threshold value.

44. An optical disc stamp formed by the process as defined in claim 34, wherein said step (a) of forming the optical disc plate further comprises the steps of:
(a5) performing a count for each revolution of the optical disc master plate with a desired clock signal;

(a6) taking in the count for each occurrence of the land pre-pit and acquiring positional information of the optical disc master plate; and (a7) designating an exposing position of the land pre-pit such that an overlapping of the land pre-pits upon each other is avoided between tracks of the optical disc master plate adjacent in the radial direction from the acquired positional information.

45. An optical disc media formed by the process comprising the steps of:

(a) forming an optical disc plate by (a1) generating an exposure signal to expose the optical disc master plate;

(a2) emitting laser light based on the exposure signal to expose the optical disc master plate;

(a3) rotating the optical disc master plate and positioning the optical disc master plate in a circumferential direction on a radiation position of the laser light; and (a4) moving the optical disc maser plate in a radial direction and positioning the optical disc master plate on the radiation position of the laser light in the radial direction, wherein said step (a1) of generating an exposure signal comprises the substeps of:

(a11) generating a wobble signal in accordance with a predetermined basic clock signal; and (a12) generating a land pre-pit signal in accordance with a basic clock signal;

(b) forming a stamp by spattering and electroforming said formed optical disc;

(c) injection molding an optical disc substrate using the formed stamp; and (d) pasting a film onto the optical disc substrate to form the optical disc media.

46. An optical disc media formed by the process as defined in claim 45, wherein said step (a11) of generating a wobble signal comprises the substeps of:

(a111) dividing a frequency of the basic clock signal; and (a112) generating the wobble signal in accordance with a divided signal obtained by the step (a111) of frequency dividing the basic clock signal.

47. An optical disc media formed by the process as defined in claim 45, wherein said step (a111) of generating a wobble signal comprises the substeps of:

(a111) storing waveform data of plural waveform exposing signals, and for at least one among the plural waveform data, storing plural exposure signals with different phases;

(a112) selecting waveform data stored in said storing step (a111); and (a113) converting the selected waveform data from a digital signal to an analog signal to generate the wobble signal.

48. An optical disc media formed by the process as defined in claim 45, wherein said step (a) of forming the optical disc plate further comprises the steps of:

(a5) obtaining an arrangement scheduling position of a land pre-pit on a radial position;

(a6) obtaining a position where the land pre-pit overlaps in the radial direction of the optical disc master plate from an overlapping position of the land pre-pit; and (a7) designating the exposing position of the land pre-pit such that the overlapping of the land pre-pits upon each other is avoided between tracks of the optical disc master plate adjacent in the radial direction, from the obtained position.

49. An optical disc media formed by the process as defined in claim 45, wherein said step (a) of forming the optical disc plate further comprises the steps of:

(a5) counting a length of a 2-sync-frame formed on the optical disc master plate with the basic clock signal;

(a6) taking in a count value counted by the 2-sync-frame counter for each revolution of the optical disc master plate to obtain a phase difference between tracks adjacent to each other in the radial direction of the optical disc master plate from an obtained count value; and (a7) designing an exposing position of the land pre-pit such that an overlapping of the land pre-pits-upon each other is avoided between tracks of the optical disc master plate adjacent in the radial direction, from the obtained phase difference.

50. An optical disc media formed by the process as defined in claim 49, wherein said step (a6) of taking in a count value takes in a count value of the 2-sync-frame counter on plural positions of the optical disc master plate in a circumferential direction and obtains the phase difference between tracks adjacent to each other in a radial direction of the optical disc master plate on the respective plural positions.

51. An optical disc media formed by the process as defined in claim 49, wherein said step (a7) of designating an exposure position comprises the substeps of:

(a71) evaluating a variation of the obtained phase difference with regard to a tolerable variation width of the phase difference between adjacent tracks to avoid mutual overlapping between the land pre-pits; and (a72) outputting an exposure alarm signal to indicate an abnormal state of exposure in accordance with the evaluation, when a variation of the obtained phase difference exceeds a tolerable variation width of the phase difference.

52. An optical disc media formed by the process as defined in claim 49, wherein said step (a7) of designating an exposure position comprises the substeps of:

(a71) counting a number of tracks on the optical disc master plate;

(a72) judging an exposure position which approaches to a predetermined extent onto a position where the land pre-pits mutually overlap, from the count of the number of tracks and the obtained phase difference;

(a73) storing data of a number of tracks on which the land pre-pits are arranged adjacently to each other;

(a74) judging that the land pre-pits are located on a position at which the land pre-pits mutually overlap based on the number data stored in step (a7) and the counted number of tracks in step (a71), when judging in step (a72) that an exposure position approaches onto the position where the land pre-pits overlap mutually; and (a75) designating the exposure position of the land pre-pits to avoid an overlap of the land pre-pits based on the judgment in step (a74).

53. An optical disc media formed by the process as defined in claim 52, wherein said step (a7) of designating an exposure position comprises the further substeps of:

(a76) comparing the obtained phase difference with a threshold value;

(a77) judging that the land pre-pits are arranged on a position where the land pre-pits overlap mutually, when the obtained phase difference becomes smaller than the threshold value;

(a78) designating the exposure position of the land pre-pit to avoid the overlap based on the judgment in step (a76); and (a79) adjusting the magnitude of the threshold value.

54. An optical disc media formed by the process as defined in claim 49, wherein said step (a7) of designating an exposure position comprises the substeps of:

(a71) comparing the obtained phase difference with a threshold value;

(a72) judging that the land pre-pits are arranged on a position where the land pre-pits overlap mutually, when the obtained phase difference becomes smaller than the threshold value;

(a73) designating the exposure position of the land pre-pit to avoid the overlap based on the judgment in step (a72); and (a74) adjusting the magnitude of the threshold value.

55. An optical disc media formed by the process as defined in claim 45, wherein said step (a) of forming the optical disc plate further comprises the steps of:

(a5) performing a count for each revolution of the optical disc master plate with a desired clock signal;

(a6) taking in the count for each occurrence of the land pre-pit and acquiring positional information of the optical disc master plate; and (a7) designating an exposing position of the land pre-pit such that an overlapping of the land pre-pits upon each other is avoided between tracks of the optical disc master plate adjacent in the radial direction from the acquired positional information.

* * * * *